United States Patent
Kundermann et al.

(10) Patent No.: US 6,499,578 B1
(45) Date of Patent: Dec. 31, 2002

(54) MULTIPLE-CLUTCH DEVICE

(75) Inventors: Wolfgang Kundermann, Schweinfurt (DE); Jörg Sudau, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/678,445

(22) Filed: Oct. 2, 2000

(30) Foreign Application Priority Data

Sep. 30, 1999 (DE) .......................................... 199 46 857
Nov. 17, 1999 (DE) .......................................... 199 55 365
Feb. 1, 2000 (DE) .......................................... 100 04 189

(51) Int. Cl.[7] .......................... F16D 21/06; F16D 13/72
(52) U.S. Cl. ................. 192/87.11; 192/48.91; 192/70.12; 192/87.15; 192/113.34
(58) Field of Search ................. 192/70.12, 70.14, 192/87.11, 87.14, 87.15, 48.8, 48.9, 48.91, 85 AA, 106 F, 113.34, 113.35, 113.36; 475/146

(56) References Cited

U.S. PATENT DOCUMENTS

| | | | |
|---|---|---|---|
| 3,823,802 A | | 7/1974 | Winzeler et al. |
| 4,450,944 A | * | 5/1984 | Fujioka et al. ............ 192/70.12 |
| 5,232,411 A | * | 8/1993 | Hayashi et al. ............. 475/146 |
| 5,261,517 A | | 11/1993 | Hering |
| 5,495,927 A | | 3/1996 | Samie et al. |
| 5,887,690 A | | 3/1999 | Haupt |
| 5,890,392 A | | 4/1999 | Ludanek et al. |
| 5,934,435 A | * | 8/1999 | Bauer ..................... 192/113.34 |
| 5,967,929 A | * | 10/1999 | Matsuoka et al. .... 192/87.11 X |
| 6,059,682 A | | 5/2000 | Friedmann et al. |
| 6,062,367 A | * | 5/2000 | Hirayanagi et al. .... 192/113.36 |

FOREIGN PATENT DOCUMENTS

| | | | |
|---|---|---|---|
| DE | 44 15 664 A1 | 11/1995 | |
| DE | 196 31 983 C1 | 2/1998 | |
| DE | 198 00 490 A1 | 8/1998 | |
| EP | 822 350 A2 | 2/1998 | |
| EP | 931 951 A1 | 7/1999 | |
| FR | 2 759 132 A1 | 8/1998 | |
| JP | 2-248748 A | * 10/1990 | ............. 192/70.12 |
| JP | 10 252 777 | 9/1998 | |

* cited by examiner

Primary Examiner—Richard M. Lorence
(74) Attorney, Agent, or Firm—Cohen, Pontani, Lieberrman & Pavane

(57) ABSTRACT

The invention is directed to a multiple-clutch device, such as a double-clutch device, for arranging in a drivetrain of a motor vehicle between a drive unit and a transmission, wherein the clutch device has a first clutch arrangement associated with a first transmission input shaft of the transmission and a second clutch arrangement associated with a second transmission input shaft of the transmission for transmitting torque between the drive unit and the transmission. According to one aspect of the invention, it is suggested that at least one of the clutch arrangements is constructed as a plate clutch arrangement and has an actuating piston defining a pressure chamber for actuation, preferably for engagement, of the plate clutch arrangement by means of a pressure medium, preferably hydraulic medium, wherein cooling fluid, possibly cooling oil, can be supplied to the plate clutch arrangement from a cooling fluid supply, possibly a cooling oil supply, wherein the actuating piston, and also, if desired, a plate carrier, possibly an outer plate carrier, has at least one pressure compensation opening and/or cooling fluid outlet opening in a radial outer and/or central area.

14 Claims, 14 Drawing Sheets

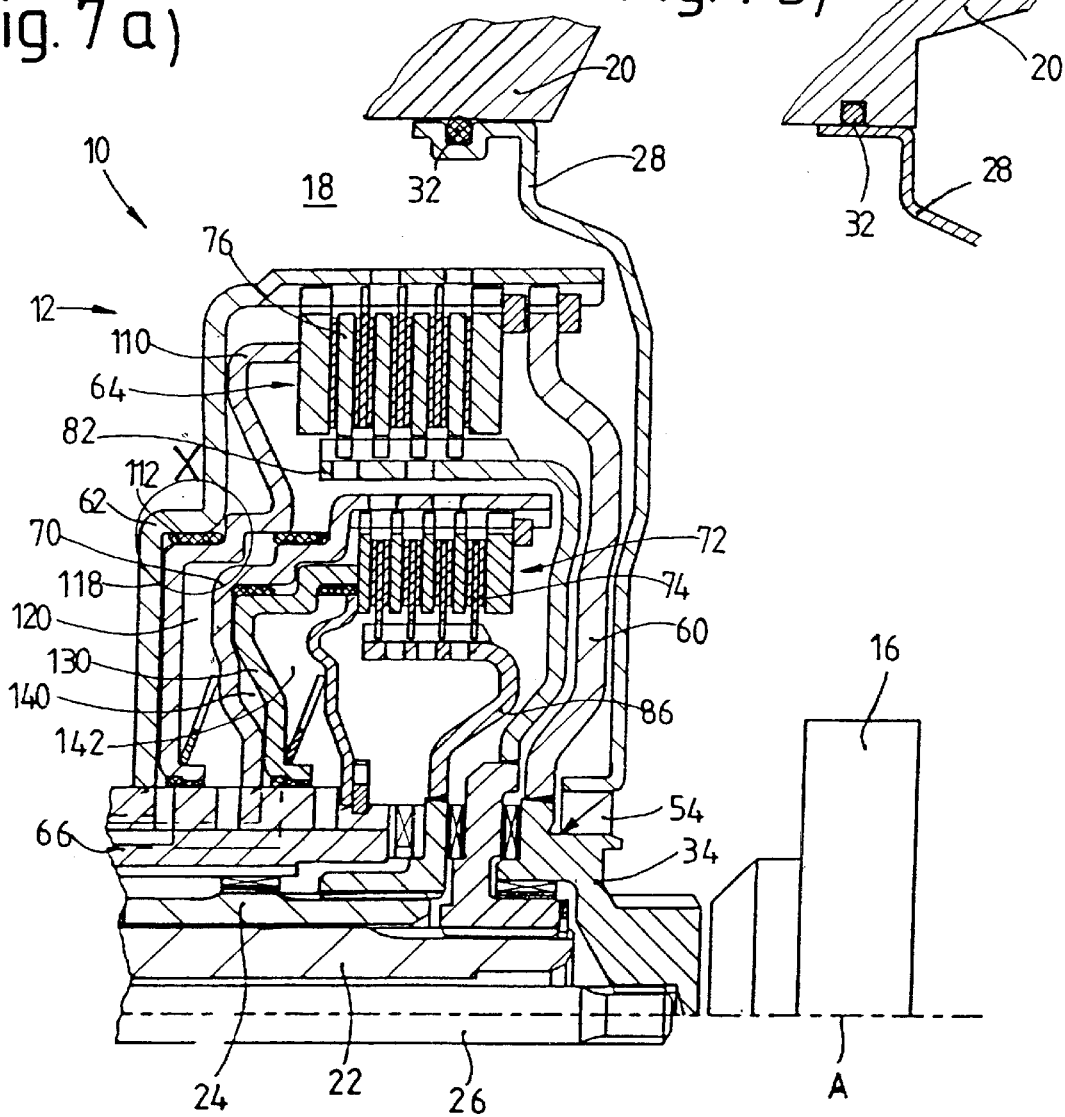
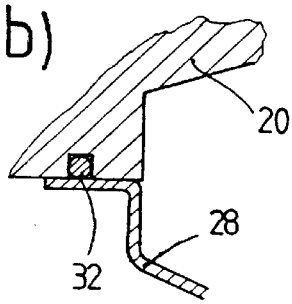
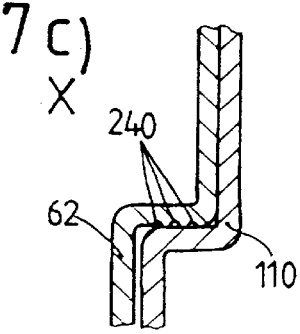

MULTIPLE-CLUTCH DEVICE

BACKGROUND OF THE INVENTION

1. Field of the Invention

The invention is directed to a multiple-clutch device, such as a double-clutch device, for arrangement thereof in a drivetrain of a motor vehicle between a drive unit and a transmission, wherein the clutch device has a first clutch arrangement associated with a first transmission input shaft of the transmission and a second clutch arrangement associated with a second transmission input shaft of the transmission for transmitting torque between the drive unit and the transmission.

2. Description of the Related Art

A clutch device of this type is known, for example, from EP 0 931 951 A1. The clutch device serves to connect the drive of a motor vehicle with a multiple-speed shift transmission via two friction clutches which are preferably automatically actuated, wherein a disengagement or release system is allocated to each of these two friction clutches, so that the two friction clutches can be engaged or released independently from one another. A clutch disk of one of the two friction clutches is arranged on a central transmission input shaft so as to be fixed with respect to rotation relative to it, while a clutch disk of the other friction clutch engages at a second transmission input shaft so as to be fixed with respect to rotation relative to it, this second transmission input shaft, constructed as a hollow shaft, enclosing the central transmission input shaft. The known double-clutch is arranged with a fixed thrust plate of one friction clutch at a flywheel of an internal combustion engine. To this extent, the arrangement of the double-clutch in a drivetrain substantially corresponds to the arrangement of conventional (single)friction clutches in the drivetrain.

Double-clutch devices (called simply double-clutches) of the type mentioned above have attracted great interest recently and are generally formed of two wet or dry clutches which are switched alternately, possibly also with overlapping. Particularly in connection with a multiple-speed shift transmission, clutches of this type make it possible to carry out shifting processes between two respective transmission speeds of the transmission without interruption of tractive forces.

In principle, double-clutch devices make it possible for both clutches to be applied jointly in especially difficult starting processes, particularly those common in car racing. For this purpose, the accelerator pedal can be deflected to its stop, as the case may be, while the motor vehicle is kept essentially stationary at the same time by applying the maximum braking force until the clutch has reached its optimal transmission point. When the braking action is canceled at the moment of reaching the optimal transmission point, the vehicle is started with maximum acceleration. Starting processes of this kind are also considered for motor vehicles with a relatively weak engine under extreme starting conditions, for example, when starting on an obstruction; that is, they are not considered only for racing cars.

Obviously, starting processes of the type described above lead to high slippage with a correspondingly extensive development of heat. This presents the problem of carrying away this heat from the area of the friction clutch serving as starting clutch. Further, a correspondingly high wear of the friction clutch must be taken into account. Moreover, heating of the friction clutches is accompanied by changes in the coefficient of friction of the friction clutches, so that control of the release mechanisms of the two friction clutches, and therefore control of the two friction clutches relative to one another, can be appreciably impaired. Since inaccuracies or changes in the functional matching of the two friction clutches relative to one another caused by heat can have the result that a torque ratio not intended in the shifting process is applied to the transmission input shafts, shifting processes in the shift transmission can be subjected to load. The synchronization in the shift transmission can be overtaxed in this way, so that, in the worst case, the shift transmission can be damaged to the point of complete failure, apart from disadvantages with respect to efficiency which occur in any case. On the whole, mismatching between the two friction clutches caused by heat is incompatible with a problem-free torque transmission in shifting processes in the shift transmission without interruption of tractive force and without jerking during shifting.

Another problem area in a double-clutch device relates to starting processes carried out in opposition to an inclination, wherein the motor vehicle must be prevented from rolling backward, or those which are used when parking at the lowest possible speed, for example, for precise positioning of a motor vehicle in a parking space. The operating states mentioned above are referred to in technical circles as "hill-holding" and "creeping". Both starting processes have in common that the friction clutch serving as starting clutch is operated, sometimes without actuation of the accelerator, over a longer period of time with slip. Although the torques to be transmitted in such starting processes lie well below those occurring under the operating conditions described above, especially in car racing, an intensive heating of the respective friction clutch or even both friction clutches can occur, resulting in the problems detailed above.

Suggestions have been made for gear-shifting strategies and shifting processes for double-clutch transmissions based on the aimed for adjustment of clutch slip (DE 196 31 983 C1) with consequent generation of friction heat. Depending on driving behavior, overheating problems of the type mentioned above cannot be ruled out.

The risk of intensive overheating exists not only in a dry friction clutch, but can also occur in so-called "wet" friction clutches, possibly in the form of a disk or plate clutch, which are operated by the action of a viscous operating medium such as hydraulic fluid. By way of example, a gear change box with two plate clutches is known from DE 198 00 490 A1, wherein one plate clutch is provided for forward driving and the other for driving in reverse. DE 198 00 490 A1 is concerned primarily with providing adequate cooling of the two plate clutches using the viscous operating medium. In spite of the liquid cooling, heating of the friction clutches is also a considerable problem in plate clutches because the operating medium, which usually flows through friction facing grooves or the like to carry off the heat, cannot be guided between the plates in optimal quantity. The reason for this is that, on one hand, excessive flow through the friction facing grooves or the like would build up a counterpressure between the friction surfaces of two adjacent plates and would therefore reduce the capacity of the friction clutches to transmit torque (with a corresponding increase in slip and therefore additional generation of friction heat, so that the problem of overheating is exacerbated) and, on the other hand, the operating medium could be overheated and destroyed when flowing through between the plates. Overheating in plate clutches can result in that the friction surfaces can no longer separate from one another completely during a disengaging process and, consequently, torques can still be transmitted via the clutch which should be disengaged, so that considerable drag torques can reach the associated shift transmission. When plate clutches are used in a multiple-clutch device, especially a double-clutch device, of the type mentioned above, shifting processes could again be brought under load in the shift transmission with resulting overtaxing of the synchronization in the shift transmission.

One approach to mastering overheating problems in the area of friction clutches in case of unfavorable operating conditions, for example, with problematic starting processes in a motor vehicle, is to provide another starting element in addition to the first and second clutch arrangements which is in the form of a hydraulic clutch or hydrodynamic clutch and comprises a hydrodynamic circuit with an impeller wheel, a turbine wheel and, if desired, a stator wheel. The driving member can be connected in parallel with one of the two friction clutches; that is, it can act on a common transmission input shaft irrespective of the engagement state of this friction clutch. A clutch device in which two plate clutches and a starting element of this type are integrated, was described in the German Patent Application 199 46 857.5 by the present Applicants which was applied for on Sep. 30, 1999 and whose disclosure is incorporated in the subject matter disclosed in the present application.

Within the framework of investigations undertaken by the present Applicants in connection with double-clutch devices, it was shown in general that wet-type clutches exhibit sealing problems and problems relating to output losses. Further, it was shown that boundary conditions relating to the available axial and radial installation space could be adhered to only with difficulty, if at all, based on the previously known concepts. With regard to clutches, possibly, diaphragm clutches, which are actuated by pistons integrated in the clutch device, the arrangement of the piston chambers associated with the pistons proved especially problematic.

SUMMARY OF THE INVENTION

It is the object of the invention to achieve improvements with respect to at least one of the problems mentioned above and/or other problems.

According to a first independent aspect of the invention, for a multiple-clutch device, such as a double-clutch device, for arranging in a drivetrain of a motor vehicle between a drive unit and a transmission, which clutch device has a first clutch arrangement associated with a first transmission input shaft of the transmission and a second clutch arrangement associated with a second transmission input shaft of the transmission for transmitting torque between the drive unit and the transmission, it is suggested that at least one of the clutch arrangements is constructed as a plate clutch arrangement and has an actuating piston defining a pressure chamber for actuation, preferably for engagement, of the plate clutch arrangement by means of a pressure medium, preferably hydraulic medium, wherein cooling fluid, e.g. cooling oil, can be supplied to the plate clutch arrangement from a cooling fluid supply. According to the invention, it is further suggested that the actuating piston, and also, if desired, a plate carrier, possibly an outer plate carrier, has at least one pressure compensation opening and/or cooling fluid outlet opening in a radial outer and/or central area. The reason for this step is that when the only outlet provided for the cooling fluid is through the area of the plates a certain accumulation of cooling fluid in a radial outer area of the clutch device next to the actuating piston can hardly be avoided at least when larger amounts of cooling fluid are supplied to the at least one plate clutch arrangement, for instance, during slip states with corresponding heat development (for example, when starting). In this case, forces based on an interaction between the actuating piston and cooling fluid can then act upon the actuating piston, especially, for example, forces caused by centrifugal force or hydrodynamic forces. Considered in general, pressure differences can occur between the two sides of the piston for different reasons which impede the engagement and/or disengagement of the associated clutch arrangement. Such impairments of the actuating piston are prevented or at least appreciably reduced by the proposed step.

In order to ensure a sufficient flow of cooling fluid through the plates in spite of the possibility for cooling fluid to flow out through the pressure compensation opening and/or cooling fluid outlet opening, according to the invention, while circumventing the plates, a conducting element can be provided adjacent to the pressure compensation opening and/or cooling fluid outlet opening, which conducting element reinforces a flow of cooling fluid through the plates. A particularly advantageous and space-saving suggestion in this respect consists in that the conducting element is formed by an axial outer plate of the plate clutch arrangement having a fluid-conducting portion.

A particularly preferred construction is characterized in that the plate carrier and the actuating piston are alternately cut out in circumferential direction so that they can engage one inside the other such that, in at least one stroke position of the actuating piston, at least one area of the actuating piston that is not cut out engages in at least one cutout of the plate carrier preferably serving as a pressure compensation opening and/or cooling fluid outlet opening and/or at least one area of the plate carrier that is not cut out engages in at least one cutout of the actuating piston preferably serving as a pressure compensation opening and/or cooling fluid outlet opening. This construction is also advantageous regardless of whether or not at least one pressure compensation opening and/or cooling fluid outlet opening is provided according to the invention because it makes it possible to economize on axial installation space. However, the cutouts are generally open in both axial directions, that is, they are constructed as through-openings, so that the plate carrier and the actuating piston can engage in one another such that the one is penetrated by the other. The cutouts which are continuous in axial direction also compulsorily serve as pressure compensation opening and/or cooling fluid outlet opening.

The first clutch arrangement as well as the second clutch arrangement are preferably constructed as plate clutch arrangements. It is suggested for this purpose that a plate carrier of the first clutch arrangement having plates with a larger friction radius and an actuating piston associated with this clutch arrangement are alternately cut out in circumferential direction so as to allow the plate carrier and actuating piston to engage one inside the other and/or wherein a plate carrier of the second clutch arrangement having plates with a smaller friction radius and an actuating piston associated with this clutch arrangement are alternately cut out in circumferential direction so as to allow the plate carrier and actuating piston to engage one inside the other. This results in the above-mentioned advantages with respect to economizing on axial installation space, wherein it is suggested by way of further development for a particularly compact construction of the clutch device that the actuating piston of the first clutch arrangement and the plate carrier of the second clutch arrangement are alternately cut out in circumferential direction so that they can engage one inside the other such that, in at least one stroke position of the actuating piston, at least one area of the actuating piston that is not cut out engages in at least one cutout of the plate carrier, which cutout preferably serves as a pressure compensation opening and/or cooling fluid outlet opening and/or at least one area of the plate carrier that is not cut out engages in at least one cutout of the actuating piston, which cutout preferably serves as a pressure compensation opening and/or cooling fluid outlet opening.

In general, it is provided for this purpose that the mutual engagement is given for every stroke position of the respective actuating piston in order to prevent the actuating piston from rotating relative to the respective plate carrier. For this purpose, a defined rotational play can be provided between the respective piston and the respective plate carrier; however, the components mentioned above can also be carried out with respect to one another in such a way that no significant relative play can occur between them. For the sake of completeness, however, it should also be noted that it can be provided in general that the pistons can be rotatable relative to the plate carriers or that one of the pistons can be rotatable relative to an associated plate carrier or both plate carriers. The pistons or piston can then be used as a damping mass.

According to a second independent aspect of the invention, for a multiple-clutch device, such as a double-clutch device, for arranging in a drivetrain of a motor vehicle between a drive unit and a transmission, which clutch device has a first clutch arrangement associated with a first transmission input shaft of the transmission and a second clutch arrangement associated with a second transmission input shaft of the transmission for transmitting torque between the drive unit and the transmission, it is suggested that at least one of the clutch arrangements is constructed as a plate clutch arrangement, wherein cooling fluid, such as cooling oil, can be supplied to the plate clutch arrangement from a cooling fluid supply, wherein at least one wall which shields an interior space of the clutch device and which is arranged in a torque transmission path between an input side of the clutch device and an output side of one of the clutch arrangements has, in a radial outer area and/or central area, at least one pressure compensation opening and/or cooling fluid outlet opening. Unwanted effects which are mediated through the cooling fluid and might possibly interfere with the engagement and/or disengagement of the plate clutch arrangement can accordingly be prevented or reduced. The preceding remarks relating to the first aspect of the invention apply in a corresponding manner.

The wall can comprise a plate carrier, particularly an outer plate carrier, having at least one pressure compensation opening and/or cooling fluid outlet opening. Reference is had to the inventive suggestion according to the first aspect and the accompanying descriptions.

The inventive idea can also be applied to other parts of the multiple-clutch device, for example, to a wall portion which is used for transmission of torque between a plate carrier and an input side of the clutch device, such as a clutch device hub, and which, according to the invention, then has at least one pressure compensation opening and/or cooling fluid outlet opening and which is part of the wall. A conducting element reinforcing a flow of the cooling fluid through the plates can be provided axially adjacent to the pressure compensation opening and/or cooling fluid outlet opening of the wall portion. The conducting element can be formed by an axial outer plate of the plate clutch arrangement having a fluid conducting portion. A portion of the wall portion located farther outward radially relative to the pressure compensation opening and/or cooling fluid outlet opening can also come under consideration as a conducting element.

With respect to the pressure compensation opening and/or cooling fluid outlet opening according to the first or second aspect of the invention, it should be added generally that this portion of the actuating piston or plate carrier or wall which generally extends in radial direction can be provided so that cooling fluid can flow through the opening essentially in axial direction. The pressure compensation opening and/or cooling fluid outlet opening according to the invention is another opening in addition to openings which may possibly be provided in the plate carriers to enable a cooling fluid flow through the plate stack and contributes at most secondarily, if at all, to the flow of cooling fluid flowing through the plate stack.

According to a third independent aspect of the invention, for a multiple-clutch device, such as a double-clutch device, for arranging in a drivetrain of a motor vehicle between a drive unit and a transmission, which clutch device has a first clutch arrangement associated with a first transmission input shaft of the transmission and a second clutch arrangement associated with a second transmission input shaft of the transmission for transmitting torque between the drive unit and the transmission, it is suggested that the first clutch arrangement and the second clutch arrangement are both constructed as plate clutch arrangements, wherein cooling fluid, such as cooling oil, can be supplied to the plate clutch arrangements from a cooling fluid supply, wherein a cooling fluid path to the plates of one of the clutch arrangements extends through at least one fluid passage opening in a wall portion of a plate carrier, possibly an inner plate carrier, of the other clutch arrangement, which wall portion connects a plate carrier hub with a plate retaining portion, and/or a fluid-conducting arrangement is provided for reinforcing a cooling fluid flow through a plate stack of at least one of the clutch arrangements.

According to this inventive idea, it is possible to supply both plate clutch arrangements with a sufficient quantity of cooling fluid, wherein it is also possible to supply a particularly large flow of cooling fluid to one of the two clutch arrangements which serves, for example, as a starting clutch or is operated with regulated slip, so that it must be ensured that friction heat is carried off in a particularly effective manner. This also holds true when a radial outer clutch arrangement of the first and second clutch arrangements surrounds a radial inner clutch arrangement annularly. In this case, it is preferred that the plate carrier having the fluid passage opening belongs to the radial inner clutch arrangement. A larger portion of the available cooling fluid can then flow past the inner clutch arrangement in order to cool the outer clutch arrangement in a particularly effective manner.

The fluid-conducting arrangement can contribute in an especially effective manner to ensure a sufficient cooling of the plates of the clutch arrangements. The fluid-conducting arrangement can comprise a conducting element which is formed by a plate of the respective plate clutch arrangement having a fluid-conducting portion. Further, it is suggested that the fluid-conducting arrangement comprises a wall which shields, at least in some areas, an interior space of the clutch device and which is arranged in a torque transmission path between an input side of the clutch device and an output side of one of the clutch arrangements. The wall can comprise a plate carrier, possibly an inner plate carrier, of the respective plate clutch device (whose plates are to be supplied with cooling fluid with the cooperation of the fluid-conducting arrangement) and/or of the other plate clutch device. Further, it is possible that the wall comprises a wall portion used for transmission of torque between a plate carrier and the input side of the clutch device. Other components of the multiple-clutch device can also perform a fluid-conducting function in the sense described above, for example, a wall of a pressure chamber, a wall of a pressure compensation chamber or even an actuating piston.

According to a fourth independent aspect of the invention, for a multiple-clutch device, such as a double-clutch device, for arranging in a drivetrain of a motor vehicle between a drive unit and a transmission, which clutch device has a first clutch arrangement associated with a first transmission input shaft of the transmission and a second clutch arrangement associated with a second transmission input shaft of the transmission for transmitting torque between the drive unit and the transmission, it is suggested that at least one of the clutch arrangements is constructed as a plate clutch arrangement to which cooling fluid, such as cooling oil, can be supplied by a cooling fluid supply, possibly a cooling oil supply, wherein a plate stack of the plate clutch arrangement has metal plates, such as steel plates, having no facing and plates having friction facings and an inner plate carrier and an outer plate carrier of the plate clutch arrangement are constructed for allowing at least one flow of cooling fluid to enter between plates of the plate stack from the radial inner side in such a way that, at least in one operating state of the clutch arrangement, the cooling fluid flows directly against steel plates having no facing and/or plates having a sintered facing and flows directly along the latter in radial outward direction.

It is achieved by means of the inventive suggestion that the plates which, because of the way they are constituted, absorb friction heat and store it temporarily depending on their heat capacity (plates with friction facings made of thermally insulating material, e.g., paper material, are capable of this only to a comparatively slight degree at best) and which consequently provide at least a majority of the available heat capacity interact with the cooling fluid so that this heat can be effectively absorbed by the plates and therefore guided away so that effective cooling is provided as a result. For this purpose, a passage opening of the inner plate carrier which overlaps an axial area occupied by the respective plate when the clutch arrangement is engaged can be allocated to the respective metal plate or the plate having the sintered facing against which the flow is directed. Alternatively, the passage opening can overlap the axial area occupied by the respective plate when the clutch arrangement is disengaged when a particularly effective dissipation of heat is to be effected by utilizing the heat buffer function of the plate in the disengaged state of the clutch arrangement. The passage opening preferably overlaps the axial area occupied when the clutch arrangement is engaged, as well as the axial area of the respective plate occupied when the clutch arrangement is disengaged, in order to provide for good heat dissipation in both states of the clutch arrangement.

At least one passage opening of the outer plate carrier can be allocated to the respective metal plate or the plate having the sintered facing, respectively, against which the cooling fluid flows; if desired, the passage opening is offset relative to the axial area occupied by the respective plate when the clutch arrangement is engaged and/or when the clutch arrangement is disengaged.

Generally, it is advantageous when passage openings in the inner plate carrier which are associated with different plates are offset relative to one another in circumferential direction and/or when passage openings in the outer plate carrier which are associated with different plates are offset relative to one another in circumferential direction. Every plate can then have at least one passage opening of sufficient size uniquely allocated to it in the respective plate carrier.

According to a fifth independent aspect of the invention, for a multiple-clutch device, such as a double-clutch device, for arranging in a drivetrain of a motor vehicle between a drive unit and a transmission, which clutch device has a first clutch arrangement associated with a first transmission input shaft of the transmission and a second clutch arrangement associated with a second transmission input shaft of the transmission for transmitting torque between the drive unit and the transmission, it is suggested that at least one of the clutch arrangements is constructed as a plate clutch arrangement to which cooling fluid, such cooling oil, can be supplied by a cooling fluid supply, wherein an inner plate carrier and an outer plate carrier and optionally further components of the plate clutch arrangement are constructed so as to allow at least a flow of cooling fluid to enter between plates of the plate stack from the radial inner side and flow out from the plate stack such that forces are exerted on the plates through the intermediary of the cooling fluid which act in favor of a disengagement of the plate clutch arrangement.

By reinforcing the release of the plate clutch arrangement by mediation of the cooling fluid, inertial forces which might oppose a quick release are more quickly overcome, so that the clutch device responds more quickly. This is advantageous, for example, when the plate clutch arrangement is operated with regulated slip.

The reinforcement of the releasing movement delivered by mediation through the cooling fluid is particularly advisable insofar as it frequently happens that the clutch arrangement can be released quickly (for example, as was mentioned, when the clutch arrangement is to be operated with regulated slip). Various factors can work against a quick release, for example, inertial forces which are exerted on the piston by a fluid coolant, especially cooling oil, or inertial forces which are mediated by the cooling fluid and act on the piston or which are based on the mass moment of inertia; as a rule, these inertial forces are particularly prominent when the piston releasing movement is introduced. For this reason, it is useful to reinforce the introduction of the piston releasing movement in the suggested manner above all.

In order to achieve reinforcement of the release of the plate clutch arrangement, a passage opening in the inner plate carrier and a passage opening in the outer plate carrier which allow flow through the plate stack can be offset relative to one another in such a way that the cooling fluid flowing through the plate stack is deflected in axial direction, preferably after the cooling fluid has flowed in radial direction between adjacent plates.

Forces acting in favor of a release of the plate clutch arrangement by mediation of the cooling fluid can be achieved, for example, in both of the following ways. Counterforces (reaction forces) occurring during the deflection of the cooling fluid can be utilized. Further, a drag effect of the deflected fluid can be utilized. The latter is preferred. For this purpose, it is suggested that at least the majority of the fluid flowing through the plate stack is deflected in the direction of an actuating piston of the respective plate clutch arrangement in order to achieve a drag effect of the fluid on the plates in the direction of the actuating piston and accordingly in favor of a release.

It is specifically suggested in this connection that at least one cooling fluid flow path passing the inner plates and the outer plates is provided radially between the inner plates of the plate stack and the outer plate carrier and/or radially between the outer plates of the plate stack and the inner plate carrier, wherein at least one axial positive flow of cooling fluid occurs predominantly in the direction of an actuating piston of the respective plate clutch arrangement * during operation when cooling fluid is supplied to the plate stack in order to exert a drag effect on at least some of the plates for releasing the plate clutch arrangement. In this regard, it is particularly useful when cooling fluid can flow out of the cooling fluid flow path in a first axial direction to an actuating piston and so as to pass an end plate on the actuating piston side and, when a cooling fluid flow path is provided radially between the outer plates of the plate stack and the inner plate carrier, preferably in addition to outlet possibilities, cooling fluid can flow in radial direction between adjacent plates of the plate stack and, when a cooling fluid flow path is provided radially between the inner plates of the plate stack and the outer plate carrier, if desired, in addition to outlet possibilities, cooling fluid can flow in radial direction through passage openings in the outer plate carrier. Further, it is particularly useful in this regard when cooling fluid can flow out of the cooling fluid flow path in a second axial direction opposed to the first axial direction to a counter-bearing which is associated with the actuating piston and at which the plate stack acted upon by the actuating piston can be supported, no cooling fluid—passing an end plate on the side of the counter-bearing—can flow out, or when only less cooling fluid can flow out—passing the end plate on the counter-bearing side—than in the direction of the actuating piston so as to pass the end plate on the actuating piston side. The steps mentioned above, by themselves or in combination, cause any counterforces which act opposite to the drag effect of the fluid toward a release due to the deflection of the fluid (counterforces caused by the deflecting process itself) to dominate and cause forces which act on the whole toward a release to be exerted on the plates.

According to a sixth independent aspect of the invention, for a multiple-clutch device, such as a double-clutch device, for arranging in a drivetrain of a motor vehicle between a drive unit and a transmission, which clutch device has a first clutch arrangement associated with a first transmission input shaft of the transmission and a second clutch arrangement associated with a second transmission input shaft of the transmission for transmitting torque between the drive unit and the transmission, it is suggested that at least one of the clutch arrangements is constructed as a plate clutch arrangement having a plate stack in which plates which are associated with the drive unit and which are in a torque-transmitting connection or can be brought into a torque-transmitting connection with the clutch device via an input side of the clutch device can be brought into a frictional engagement with plates which are associated with one of the transmission input shafts and which are in a torque-transmitting connection or can be brought into a torque-transmitting connection with the clutch arrangement via an output side of the clutch arrangement, wherein cooling fluid, such as cooling oil, can be supplied to the plate stack by a cooling fluid supply, wherein at least some of the plates associated with the drive unit have flow passages which make it possible for cooling fluid to flow through the plate stack, generally from the radial inner side to the radial outer side, when the plates are in frictional engagement.

Since the plates having flow passages are provided on the drive unit side, these plates are driven in rotation continuously (or at least more frequently or for longer periods of time than the plates on the transmission side) when the drive unit is running. The revolving flow passages cause a feeding effect with respect to the cooling fluid, which leads to a better distribution of the cooling fluid in the plate stack and a continuous (or at least more regular) cooling fluid flow through the plate stack resulting in improved cooling action.

The flow passages preferably comprise passages which are formed by surface structures of a respective friction surface. For example, the plates associated with the drive unit can have friction facings which are formed of paper material or sintered material, if desired, wherein the passages can be constructed, for example, in the form of facing grooves or other surface structures. In general, it is suggested that flow passages are formed in the friction facings. The plates associated with the drive unit are preferably outer plates.

The features of a multiple-clutch and a drivetrain which were indicated in connection with the different aspects of the invention can be advantageously combined. Further independent aspects of the invention will be discerned by the person skilled in the art from the preceding explanations and the description of the Figures.

The invention is further directed to a drivetrain for a motor vehicle with a clutch device, according to at least one aspect of the invention, arranged between a drive unit and a transmission.

The invention will be described more fully in the following with reference to embodiment examples shown in the Figures.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIGS. 7a) and 7b) are showings of sealing the lid with the clutch housing wherein a sealing ring is carried in the lid and in the housing respectively.

DETAILED DESCRIPTION OF THE PRESENTLY PREFERRED EMBODIMENTS

Figure 1:
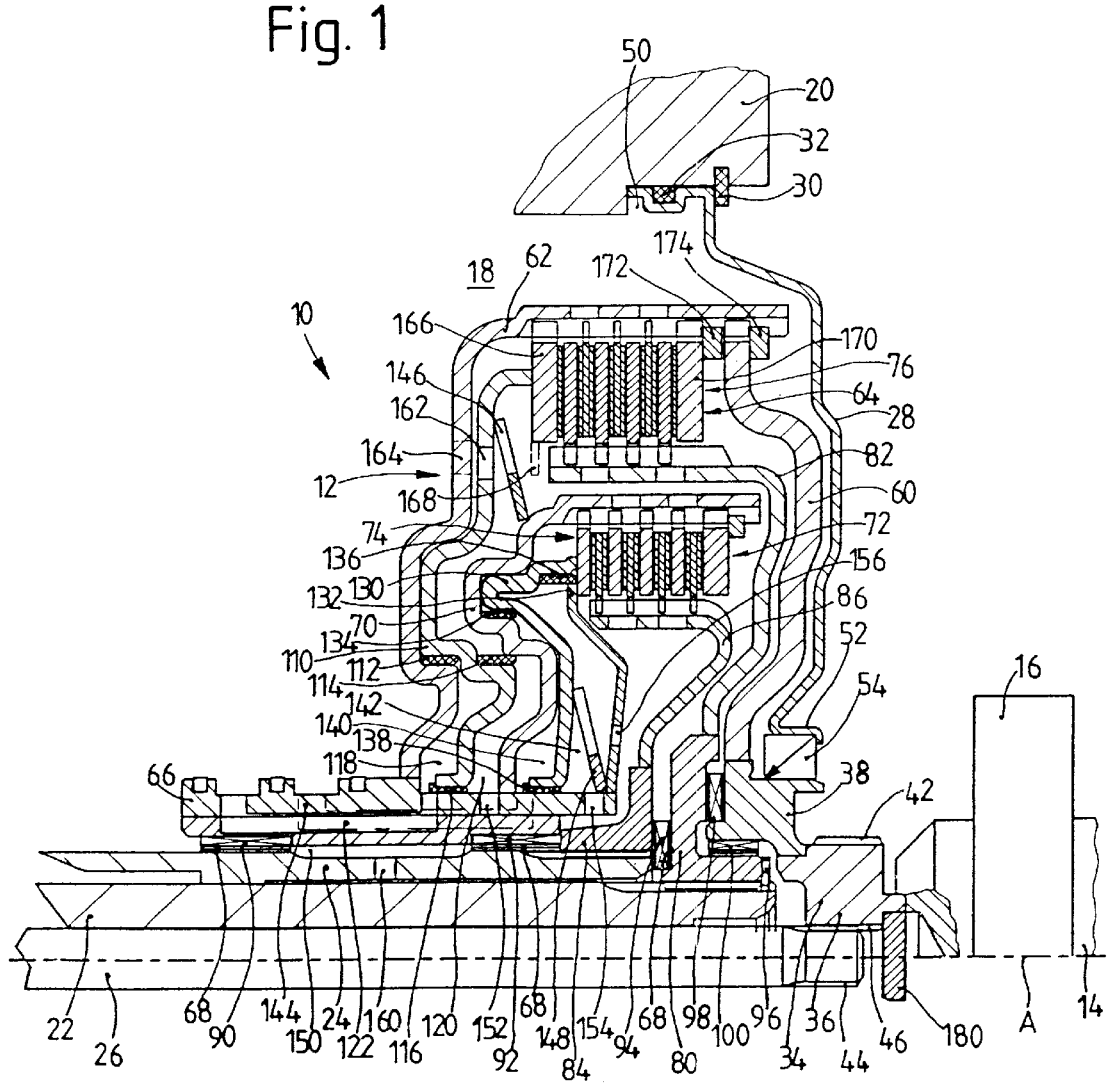
FIG. 1 is a view in partial section showing a double-clutch with two plate clutch arrangements which is arranged in a drivetrain of a motor vehicle between a transmission and a drive unit.

FIG. 1 shows a double-clutch 12 arranged in a drivetrain 10 between a drive unit and a transmission. The drive unit, for example, an internal combustion engine, is represented in FIG. 1 only by a driven shaft 14, such as a crankshaft 14, with a coupling end 16 serving to connect a torsional vibration damper, not shown. In FIG. 1, the transmission is represented by a transmission housing portion 20 defining a transmission housing cover 18 and by two transmission input shafts 22 and 24, both of which are constructed as hollow shafts, wherein transmission input shaft 22 extends through transmission input shaft 24 substantially coaxial thereto. A pump drive shaft which serves to drive a transmission-side oil pump, not shown in FIG. 1, as will be described more fully in the following, is arranged in the interior of the transmission input shaft 22.

The double-clutch 12 is received in the transmission housing cover 18, wherein the interior of the cover is closed in the direction of the drive unit by a lid 28 which is pressed into a cover housing opening and/or is secured therein by a snap ring 30. When the double-clutch has wet-type friction clutches as in the embodiment example shown in FIG. 1, for example, diaphragm clutches, it is generally arranged to provide for a tight engagement between the lid 28 and the transmission housing formed by the transmission housing cover 18, which can be produced, for example, by an O-ring or other sealing ring. FIG. 1 shows a sealing ring 32 with two sealing lips.

A clutch hub 34 which is formed of two ring portions 36, 38 secured to one another for reasons which will be explained more fully serves as the input side of the double-clutch 12. The clutch hub 34 extends through a central opening of the lid 28 in the direction of the drive unit and is coupled with the torsional vibration damper, not shown, via an external toothing 42, so that there is a torque-transmission connection between the coupling end 16 of the crankshaft 14 and the clutch hub 34 by way of this torsional vibration damper. If it is desirable to dispense with a torsional vibration damper in general, or at this location in the drivetrain, the clutch hub 34 can also be coupled directly with the coupling end 16. At its end remote of the transmission, the pump drive shaft 26 has an external toothing 44 which engages in an internal toothing 46 of the ring portion 36 of the clutch hub 34, so that the pump drive shaft 26 rotates along with the clutch hub 34 and consequently drives the oil pump when a rotational movement is imparted to the clutch hub 34, as a rule, by the drive unit and in many operating situations possibly also by the transmission via the double-clutch (for example, in the operating situation characterized under the heading of "engine brake").

The lid 28 extends radially between an annular circumferential wall portion of the housing cover 18, which defines a radial recess 50 of the housing cover 18, and the ring portion 38 of the hub 34. It is advantageous when a sealing arrangement and/or pivot bearing arrangement 54 are/is provided between a radial inner wall area 52 of the lid 28 and the hub 34, especially the ring portion 38, particularly when—as in the shown embodiment example—the lid 28 is secured to the housing cover 18 and consequently does not rotate along with the doubleclutch 12. Sealing between the lid and the hub is required particularly when the clutch arrangements of the double-clutch are wet-type clutches as in the embodiment example. A high degree of operational reliability is also achieved in case of oscillations and vibrations when the sealing and/or pivot bearing arrangement 54 is secured axially to the lid 28 and/or to the clutch hub 34, for example, by means of an end portion of the lid edge 52 which is bent radially inward as is shown in FIG. 1.

A carrier plate 60 is arranged at the ring portion 38 of the hub 34 so as to be fixed with respect to rotation relative to it and serves to transmit torque between the hub 34 and an outer plate carrier 62 of a first plate clutch arrangement 64. The outer plate carrier 62 extends in the direction of the transmission and radially inward to a ring part 66 at which the outer plate carrier is arranged so as to be fixed with respect to rotation relative to it, this ring part 66 being supported at the two transmission input shafts 22 and 24 by means of an axial and radial bearing arrangement 68 in such a way that both radial and axial forces are supported at the transmission input shafts. The axial and radial bearing arrangement 68 enables relative rotation between the ring part 66 on the one hand and the transmission input shaft 22 and transmission input shaft 24 on the other hand. The construction and operation of the axial and radial bearing arrangement will be discussed at greater length in the following.

An outer plate carrier 70 of a second plate clutch arrangement 72 is arranged at the ring part 66 farther axially in the direction of the drive unit so as to be fixed with respect to rotation relative to it, the plate stack 74 of the second plate clutch arrangement 72 being enclosed annularly by plate stack 76 of the first plate clutch arrangement. As was already indicated, the two outer plate carriers 62 and 70 are connected with one another by the ring part 66 so as to be fixed with respect to relative rotation and, together, by way of the carrier plate 60 which is in a positive-locking torque-transmitting engagement with the outer plate carrier 62 by means of an external toothing, are in a torque-transmitting connection with the clutch hub 34 and therefore—via the torsional vibration damper, not shown—with the crankshaft 14 of the drive unit. With respect to the normal flow of torque from the drive unit to the transmission, the outer plate carriers 62 and 70 serve as the input side of the plate clutch arrangement 64 and 72, respectively.

A hub part 80 of an inner plate carrier 82 of the first plate clutch arrangement 64 is arranged on the transmission input shaft 22 so as to be fixed with respect to rotation relative to it by means of a keyway toothing or the like. In corresponding manner, a hub part 84 of an inner plate carrier 86 of the second plate clutch arrangement 72 is arranged on the radially outer transmission input shaft 24 so as to be fixed with respect to rotation relative to it by means of a keyway toothing or the like. With respect to the normal torque flow from the drive unit in the direction of the transmission, the inner plate carriers 82 and 86 serve as output side of the first and second plate clutch arrangement 64 and 72, respectively.

Referring again to the radial and axial bearing support of the ring part 66 at the transmission input shafts 22 and 24, two radial bearing subassemblies 90 and 92 which act between the radial outer transmission input shaft 24 and the ring part 66 serve to support the ring part 66 radially. With respect to support in the direction of the drive unit, the axial bearing support of the ring part 66 is carried out by hub part 84, axial bearing 94, hub part 80 and a snap ring 96 which secures the hub part 80 axially to the radial inner transmission input shaft 22. The ring part 38 of the clutch hub 34 is again supported via an axial bearing 98 and a radial bearing 100 at the hub part 80. The hub part 80 is supported axially in the direction of the transmission via the axial bearing 94 at an end portion of the radial outer transmission input shaft 24. The hub part 84 can be supported directly at an annular stop or the like or at a separate snap ring or the like in the direction of the transmission at the transmission input shaft 24. Since the hub part 84 and the ring part 66 are rotatable relative to one another, an axial bearing can be provided between these components insofar as the bearing 92 does not perform both the function of an axial bearing and the function of a radial bearing. The latter is assumed in the embodiment example in FIG. 1.

As is shown in the embodiment example, it is very advantageous when the portions of the outer plate carriers 62 and 70 extending in radial direction are arranged on an axial side of a radial plane extending to an axis A of the double-clutch 12 and the portions of the inner plate carriers 82 and 86 of the two plate clutch arrangements extending in radial direction are arranged on the other axial side of this radial plane. In this way, a particularly compact construction is possible, especially when—as is shown in the embodiment example—plate carriers of one type (outer plate carrier, as in the embodiment example, or inner plate carrier) are connected with one another so as to be fixed with respect to rotation and serve in each instance as the input side of the respective plate clutch arrangement with respect to the flow of force from the drive unit to the transmission.

Actuating pistons are integrated in the double-clutch 12 for actuating the plate clutch arrangements, in the case of the embodiment example shown, for actuating the plate clutch arrangements for the purpose of engagement. An actuating piston 110 associated with the first plate clutch arrangement 64 is arranged axially between the radially extending portion of the outer plate carrier 62 of the first plate clutch arrangement 64 and the radially extending portion of the outer plate carrier 70 of the second plate clutch arrangement 72 and is axially displaceable at both outer plate carriers and at the ring part 66 by means of seals 112, 114, 116 and guided so as to seal a pressure chamber 118 formed between the outer plate carrier 62 and the actuating piston 110 and a centrifugal force pressure compensation chamber 120 formed between the actuating piston 110 and the outer plate carrier 70. The pressure chamber 118 communicates, via a pressure medium channel 122 formed in the ring part 66, with a pressure control device, e.g., a control valve, connected to a pressure medium supply, in this case, the oil pump mentioned above. The pressure medium channel 122 is connected to the pressure control device via a connection sleeve which receives the ring part 66 and which can be fixed relative to the transmission. In this connection, it should be added with reference to the ring part 66 that this ring part 66 is produced in two parts with two sleeve-like ring part portions inserted one inside the other as is indicated in FIG. 1 in order to simplify production especially with regard to the pressure medium channel 122 and an additional pressure medium channel.

An actuating piston 130 associated with the second plate clutch arrangement 72 is arranged axially between the outer plate carrier 70 of the second plate clutch arrangement 72 and a substantially radially extending wall portion 132, which is arranged at an axial end area of the ring part 66 remote of the transmission so as to be fixed with respect to relative rotation it and so as to be tight against fluid, and is guided so as to be axially displaceable by means of seals 134, 136 and 138 at the outer plate carrier 70, wall portion 132 and ring part 66 and is guided so as to seal a pressure chamber 140 formed between the outer plate carrier 70 and the actuating piston 130 and a centrifugal force pressure compensation chamber 142 formed between the actuating piston 130 and the wall portion 132. The pressure chamber 140 is connected via another pressure medium channel 144 (mentioned above) in a manner corresponding to pressure chamber 118 at a/the pressure control device. Pressure can be applied by means of the pressure control device(s) to the two pressure chambers 118 and 140 selectively (possibly also simultaneously) from the pressure medium source (in this case, the oil pump) in order to actuate the first plate clutch arrangement 64 and/or the second plate clutch arrangement 72 for purposes of engagement. Diaphragm springs 146, 148, are used for resetting, that is, for releasing the clutches; the diaphragm spring 148 associated with the actuating piston 130 is received in the centrifugal force pressure compensation chamber 142.

The pressure chambers 118 and 140 are completely filled with pressure medium (in this case, hydraulic oil) in every case during normal operating states of the double-clutch 12, and the actuating state of the plate clutch arrangements depends on the pressure of the pressure medium present at the pressure chambers. However, since the outer plate carriers 62 and 70, including the ring part 66, the actuating piston 110 and 130 and the wall portion 133, rotate along with the clutch shaft 14 during driving operation, pressure increases due to centrifugal force occur in the pressure chambers even when no pressure is applied to the pressure chambers 118 and 140 proceeding from the pressure control device; these increases in pressure could lead to unwanted engagement or at least grinding of the plate clutch arrangements at least at higher rotational speeds. The centrifugal force pressure compensation chambers 120, 142 mentioned above are provided for this reason. These centrifugal force pressure compensation chambers 120, 142 hold a pressure compensation medium and pressure increases caused by centrifugal force are brought about therein in a corresponding manner to compensate for the pressure increases due to centrifugal force which occur in the pressure chambers.

It is possible to fill the centrifugal force pressure compensation chambers 120 and 142 permanently with pressure compensation medium, for example, oil, wherein volume compensation could be provided, if need be, for receiving pressure compensation medium which is displaced in the course of actuating the actuating pistons. In the embodiment form shown in FIG. 1, the centrifugal force pressure compensation chambers 120, 142 are first filled with pressure compensation medium when the drivetrain is in operation, namely, in connection with the supply of cooling fluid, especially cooling oil as in the embodiment example, to the plate clutch arrangements 64 and 72 via an annular channel 150 formed between the ring part 66 and the outer transmission input shaft 24, wherein the bearings 90, 92 through which cooling oil can pass are associated with this ring channel 150. The cooling oil flows from a transmission-side connection between the ring part and transmission input shaft 24 in the direction of the drive unit through bearing 90 and bearing 92 and then flows in a partial flow between the end portion of the ring part 66 remote of the transmission and the hub part 84 radially outward in the direction of the plate stack 74 of the second plate clutch arrangement 72, enters the area of the plates because of the through-openings in the inner plate carrier 86, flows between the plates of the plate stack 74 and radially outward through friction facing grooves or the like in these plates, enters the area of plate stack 76 of the first plate clutch arrangement 64 through through-openings in the outer plate carrier 70 and through-openings in the inner plate carrier 82, flows radially outward between the plates of this plate stack or though friction facing grooves or the like in these plates, and then finally flows radially outward through through-openings in the outer plate carrier 62. The centrifugal force pressure compensation chambers 120, 142 are also connected to the cooling oil feed flow between the ring part 66 and the transmission input shaft 24, namely, by means of radial bore holes 152, 154 in the ring part 66. Since the cooling oil serving as pressure compensation medium in the pressure compensation chambers 120, 142 runs out of the pressure compensation chambers due to the absence of centrifugal forces when the drive unit is stationary, each of the pressure compensation chambers is re-filled during operation of the drivetrain (of the motor vehicle).

Since a pressure application surface of the actuating piston 130 associated with the pressure chamber 140 is smaller and, moreover, extends less far radially outward than a pressure application surface of the piston 130 associated with the pressure compensation chamber 142, at least one fill level limiting opening 156 which adjusts a maximum radial filling level of the pressure compensation chamber 142 giving the required centrifugal force compensation is formed in the wall portion 132. When the maximum filling state is reached, the cooling oil supplied via the bore hole 154 flows through the filling level limiting opening 156 and unites with the cooling oil flow passing radially outward between the ring part 66 and hub part 84. With respect to the piston 110, the pressure application surfaces of the piston associated with the pressure chamber 118 and the pressure compensation chamber 120 are the same size and extend within the same radial area, so that corresponding fill level limiting means are not required for the pressure compensation chamber 120.

For the sake of completeness, it should be mentioned that additional cooling flows preferably occur in operation. Accordingly, at least one radial bore hole 160 is provided in the transmission input shaft 24, wherein another cooling oil partial flow flows through this radial bore hole 160 and through an annular channel between the two transmission input shafts. This other cooling oil partial flow divides into two partial flows, one of which flows radially outward between the two hub parts 80 and 84 (through the axial bearing 94) and the other partial flow flows radially outward between the end area of the transmission input shaft 22 remote of the transmission and the hub part 80 and between this hub part 84 and the ring portion 38 of the clutch hub 34 (through the bearings 98 and 100).

Since the cooling oil flowing radially outward could accumulate next to a radially outer portion of the actuating piston 110 associated with the first plate clutch arrangement 64 and could impede the engaging movement of this piston due to centrifugal force at least at higher rotational speeds, the piston 110 has at least one pressure compensation opening 162 which enables a cooling oil flow from one side of the piston to the other. Consequently, an accumulation of cooling oil will come about on both sides of the piston with corresponding compensation of pressure forces exerted on the piston due to centrifugal force. Further, other forces based on an interaction of the cooling oil with the piston are prevented from impeding the required axial piston movements. This refers, for example, to hydrodynamic forces or the like and suction attachment of the piston to the outer plate carrier 62.

It is also possible to provide at least one cooling oil outlet opening in the radially extending, radially outer area of the outer plate carrier 62 of the first plate clutch arrangement 64. A cooling oil outlet opening of this kind is indicated in dashes at 164. In order to ensure a sufficient flow of cooling fluid (cooling oil) through the plate stack 76 of the first plate clutch arrangement 64 in spite of this, a cooling oil conducting element (generally, a cooling fluid conducting element) can be provided. It is indicated in dashed lines in FIG. 1 that an adjacent end plate 166 of the plate stack 76 could have a cooling oil conducting portion 168, so that the end plate 166 itself serves as a cooling oil conducting element.

With respect to a simple construction of the pressure control device for the actuation of the two plate clutch arrangements, it was provided in the embodiment example of FIG. 1 that a torque transmitting capacity which is given, per se, for the radial inner plate clutch arrangement 72 with reference to an actuating pressure and which is smaller compared to the other clutch arrangement 64 (because of a smaller effective friction radius than the radial outer clutch arrangement 64) is at least partially compensated. For this purpose, the pressure application surface of the piston 130 associated with the pressure chamber 140 is larger than the pressure application surface of the piston 110 associated with the pressure chamber 118, so that axially directed forces greater than those exerted on the piston 110 are exerted on piston 130, given the same hydraulic oil pressure in the pressure chambers.

It should be mentioned that the available installation space is made use of in a favorable manner due to a radial staggering of the seals associated with the piston, especially also an axial overlapping of at least some of the seals.

In addition to the above-mentioned supply of cooling oil and the forming of cooling oil through-openings (indicated only schematically in FIG. 1) in the plate carriers, steps can be taken in the plate stacks 74, 76 to prevent the risk of overheating. Accordingly, at least some of the plates are advantageously used as "heat buffers" that temporarily store heat which is formed, for example, during slip operation and which temporarily overburdens the heat dissipation possibilities allowed by cooling fluid (in this case, cooling oil) or by heat conductance via the plate carriers; in this way, the heat can be carried off at a later time, for instance, in a disengaged state of the respective plate clutch arrangement. For this purpose, the plates in the radial inner (second) plate clutch arrangement which have no friction facings are constructed so as to be thicker axially than plate carrier elements of plates having friction facings in order to provide a comparatively large material volume with corresponding heat capacity for plates without friction facings. These plates should be made of a material having a considerable heat storage capability (heat capacity), for example, steel. The plates having friction facings can temporarily store only a little heat when using conventional friction facings made from paper, for example, since paper has poor heat conductivity.

The heat capacity of the elements having friction facings can likewise be made available as heat storage when facing materials with high conductivity are used instead of facing materials with low conductivity. It is possible to use friction facings of sintered material which has a comparatively high heat conductivity. However, the problem with the use of sintered facings is that the sintered facings have a degressive curve of the coefficient of friction $\mu$ over slippage speed (relative rotational speed $\Delta N$ between the rubbing surfaces); that is, $d\mu/d\Delta N < 0$. A degressive curve of the coefficient of friction is disadvantageous insofar as it can promote self-excitation of oscillations in the drivetrain or, at least, cannot damp such oscillations. Therefore, it is advantageous when plates with friction facings of sintered material as well as plates with friction facings of another material with a progressive curve of the coefficient of friction over the slippage speed ($d\mu/d\Delta N > 0$) are provided in a plate stack, so that a progressive curve of the coefficient of friction over the slippage speed results for the plate stack as a whole or there is at least approximately a neutral curve of the coefficient of friction over the slippage speed ($d\mu/d\Delta N=0$) and, consequently, self-excitation of oscillations in the drivetrain is at least not promoted or, preferably, torsional vibrations in the drivetrain are even damped (because of a considerable progressive curve of the coefficient of friction over the slippage speed).

It is assumed in this connection that in the embodiment example of FIG. 1 the plate stack 74 of the radial inner plate clutch arrangement 60 is constructed without sintered facings, since the radial outer plate clutch arrangement 64 is preferably used as a starting clutch with corresponding slip operation. The latter, that is, the use of the radial outer plate clutch arrangement as a starting clutch, is advantageous insofar as this plate clutch arrangement can be operated with lower actuating forces (for the same torque transmitting capacity) because of the larger effective friction radius, so that the area pressure can be reduced relative to the second plate clutch arrangement. For this purpose, it is also helpful when the plates of the first plate clutch arrangement 64 are formed with a somewhat greater radial height than the plates of the second plate clutch arrangement 72. However, if desired, friction facings of sintered material can also be used for the plate stack 74 of the radial inner (second) plate clutch arrangement 72, preferably, as was already mentioned, in combination with friction facings of another material such as paper.

In the plate stack 74 of the radial inner plate clutch arrangement 72, all inner plates have friction facings and all outer plates are without friction facings, wherein the end plates defining the plate stack axially are outer plates and accordingly have no facings; in the plate stack 76 of the first plate clutch arrangement 64, the inner plates have no facings and the outer plates, including the end plates 166, 170, have friction facings. According to a preferred construction, at least the end plates 166 and 170 have facing-carrying elements which are substantially thicker axially than the facing-carrying elements of the other outer plates and are formed with facings of sintered material, so that the facing-carrying elements of the two end plates which have a comparatively large volume can be put to use as heat buffers. As with the plate stack 74, the plates having no facings are thicker axially than the plate carrying elements of the plates having friction facings (with the exception of the end plates) in order to provide a comparatively large heat capacity for temporary storage of heat. The outer plates located axially inside should, at least in part, have friction facings of a different material exhibiting a progressive curve of the coefficient of friction in order to achieve at least an approximately neutral curve of the coefficient of friction over the slippage speed for the plate stack as a whole.

Further details of the double-clutch 12 according to the described embodiment example can be readily discerned from FIG. 1 by the person skilled in the art. For example, the axial bore hole in the ring portion 36 of the clutch hub 34 in which is formed the internal toothing 46 for the pump drive shaft is closed so as to be tight against oil by means of a stopper 180 secured therein. The carrier plate 60 is fixed axially to the outer plate carrier 62 by two retaining rings 172, 174, wherein retaining ring 172 also supports the end plate 170 axially. A corresponding retaining ring is also provided for supporting the plate stack 74 at the outer plate carrier 70.

With respect to the construction of the outer plates of the first plate clutch arrangement 64 as facing-carrying plates, it should be added that an improved through-flow through the plate stack 76 is achieved in connection with the allocation of the outer plates to the input side of the clutch device when the friction facings—as is generally the case—are formed with friction facing grooves or other fluid passages which enable flow through the plate stack also in the state of frictional engagement. Since the input side also rotates along with the running drive unit and the coupling end 16 when the clutch arrangement is released, a kind of conveying action is brought about because of the revolving friction facing grooves and the revolving fluid passages, so that the through-flow through the plate stack is improved in a corresponding manner. In contrast to the view in FIG. 1, the second plate clutch arrangement could also be constructed accordingly, that is, the outer plates could be constructed as plates having friction facings.

Referring to FIGS. 2 to 14, further embodiment examples of the multiple-clutch devices according to the invention, especially double-clutch devices according to the invention, will now be described in relation to various aspects. Since the embodiment examples of FIGS. 2 to 14 correspond to the embodiment example of FIG. 1 with respect to basic construction and the views shown in FIGS. 2 to 14 will be immediately understood by the person skilled in the art based on the preceding detailed explanation of the embodiment example of FIG. 1, it will not be necessary to describe the embodiment examples in FIGS. 2 to 14 in all particulars. In this connection, reference is had to the preceding explanation of the embodiment example of FIG. 1 which can be carried over to a great extent to the embodiment examples in FIGS. 2 to 14. The reference numbers used for the embodiment examples of FIGS. 2 to 14 are the same as those used for the embodiment example in FIG. 1. For the sake of clarity, not all of the reference numbers in FIG. 1 are also shown in FIGS. 2 to 14 insofar as the double-clutches of the embodiment examples in FIGS. 2 to 14 correspond to the embodiment example of FIG. 1.

An important aspect for clutch devices with wet-type clutch arrangements is the sealing of the clutch space and, in connection with this, the fixing of the lid 28 in the opening of the clutch housing 20. In the embodiment examples in FIGS. 3, 6 and 7, the lid 28 is overdimensioned radially and is pressed into the opening of the clutch housing formed by the housing portion 20. The sealing ring 32 which seals the clutch housing is provided because the lid can sag or become wavy under certain circumstances. The sealing ring has the further object of damping any oscillations with axial relative movements between the lid 28 and the clutch housing. The sealing ring, which can be constructed as an O-ring, can be mounted at the lid and/or at the housing and, for this purpose, can be received in an annular groove of the housing (compare FIG. 7*b*) and/or in an annular groove of the lid (compare FIG. 7*a*) formed in an edge portion of the lid 28. For an enhanced sealing action, two or more O-rings which are arranged axially adjacent to one another could also be provided instead of one O-ring. Another possibility is to use a sealing ring with two or more sealing lips (compare FIG. 1 and FIG. 14).

For stricter requirements regarding tightness, the solutions applied in the embodiment examples of FIGS. 2, 6, 8, 9, 10, 11 and 12 can be considered. In some of these embodiment examples (compare, e.g., FIGS. 2 and 11), a rubber ring or plastic ring was inserted prior to mounting the lid 28 or, alternatively, an annular ring element was injection-molded. The respective sealing element provided in this manner is designated by 200 in the Figures. This elastic element, that is, the rubber or plastic ring or the injection-molded sealing element, is clamped axially between the lid 28 and the housing 20 when the lid is mounted. A double sealing is achieved in combination with the sealing ring 32. Also, the sealing element 32 can often be dispensed with because a very good sealing action is achieved by means of the axially clamped sealing element. Similar to the embodiment example in FIG. 1, a snap ring 30 takes over the function of axial securing when the clamping forces possibly acting between the lid 28 and the housing 20 are not sufficient. An alternative to the snap ring is realized in the embodiment example in FIG. 5. In this case, instead of the snap ring, an annular securing plate 210 is provided which is fastened to the clutch housing 20, e.g., by means of screws 212. Instead of an annular securing plate 210, a plurality of separate securing plate segments could also be provided. The lid 28 is secured in this way also in the embodiment example in FIG. 8. Instead of an annular securing plate or a plurality of securing plate segments, screws which are screwed into the clutch housing and which have screw heads projecting in the radial area of the lid 28 or washer elements (for example, washers or springs) could also be provided.

Figure 9:
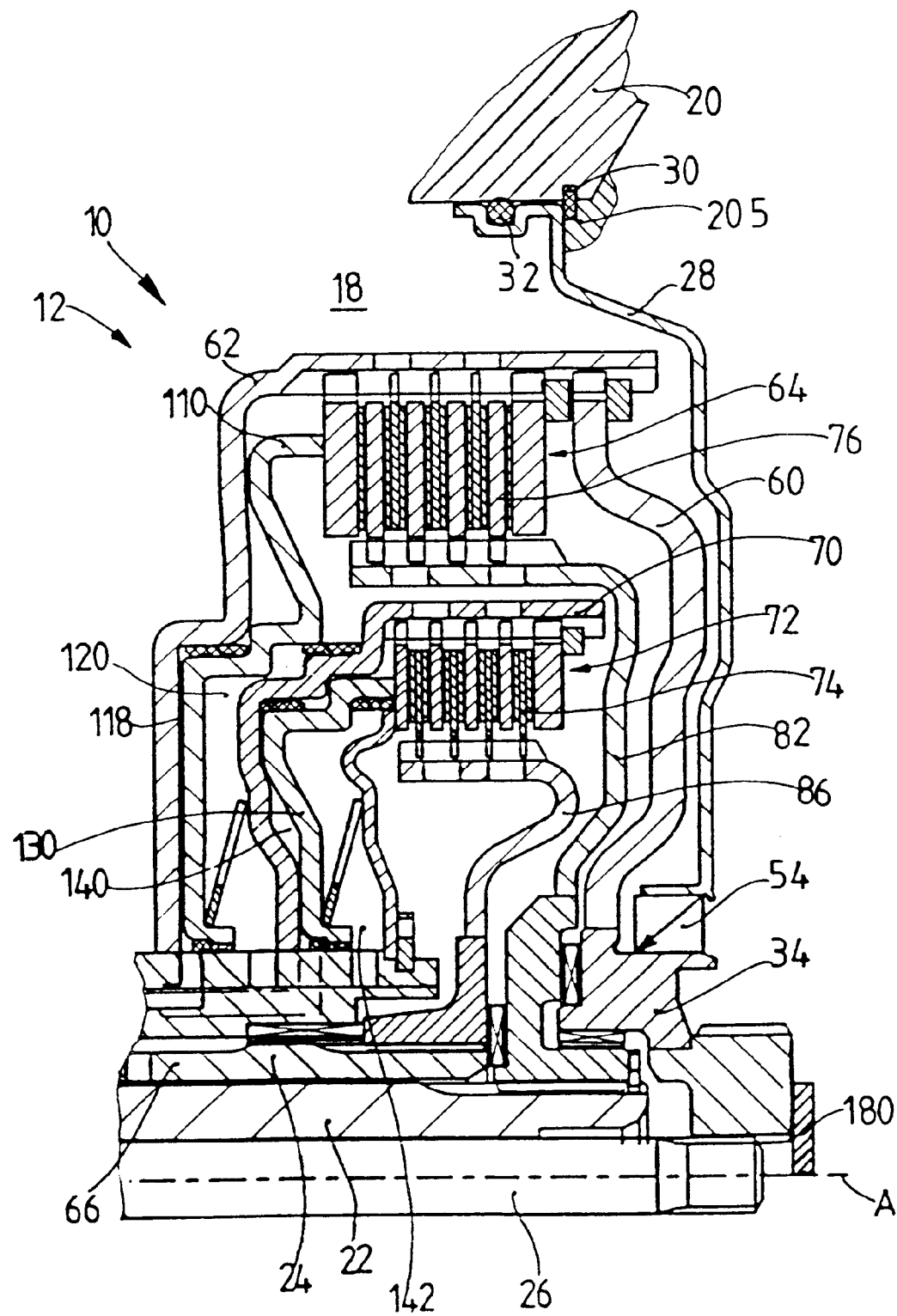
FIG. 9 shows sealing of the clutch space with a sealing compound.
Figure 10:
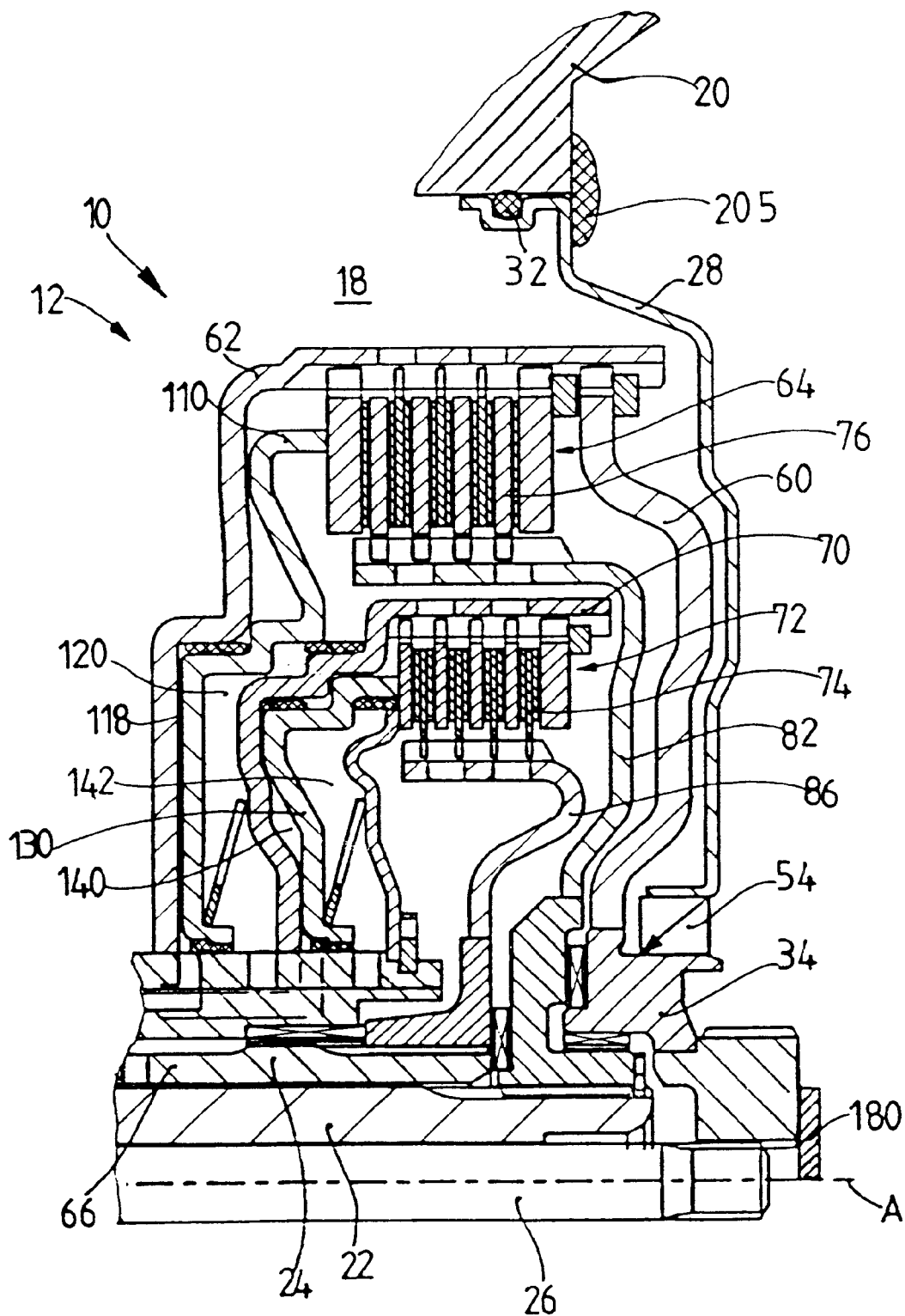
FIG. 10 a further manner of sealing the clutch space using sealing compound.

An excellent sealing of the clutch space is achieved by means of the solutions realized in the embodiment examples in FIGS. 9 and 10. In these embodiment examples, a sealing compound 205, for example, a sealing foam 205 (or alternatively an elastomer or the like), was sprayed on the sealing joint between the lid 28 and the housing 20 after mounting the lid 28. This foam 205 (or, generally, this sealing compound 205) can additionally take over the function of axially securing the lid 28 (the snap ring 30 of the embodiment example in FIG. 9 can accordingly possibly be dispensed with). Further, the foam 205 can dampen oscillations with axial relative movements and/or radial relative movements between the lid 28 and the housing 20.

Figure 6:
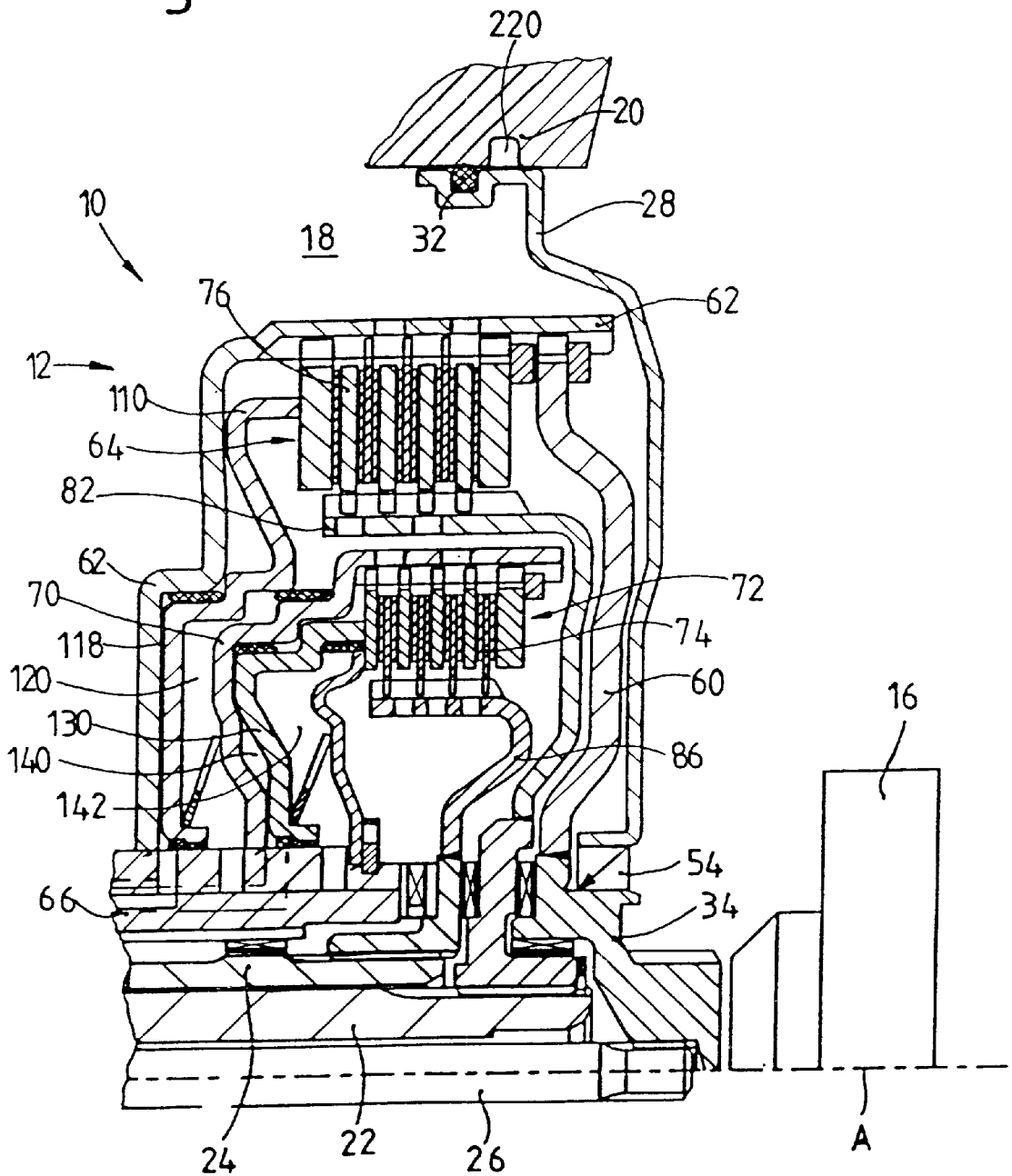
FIG. 6 is a view depicting an oil drain channel provided in the clutch housing.
Figure 8:
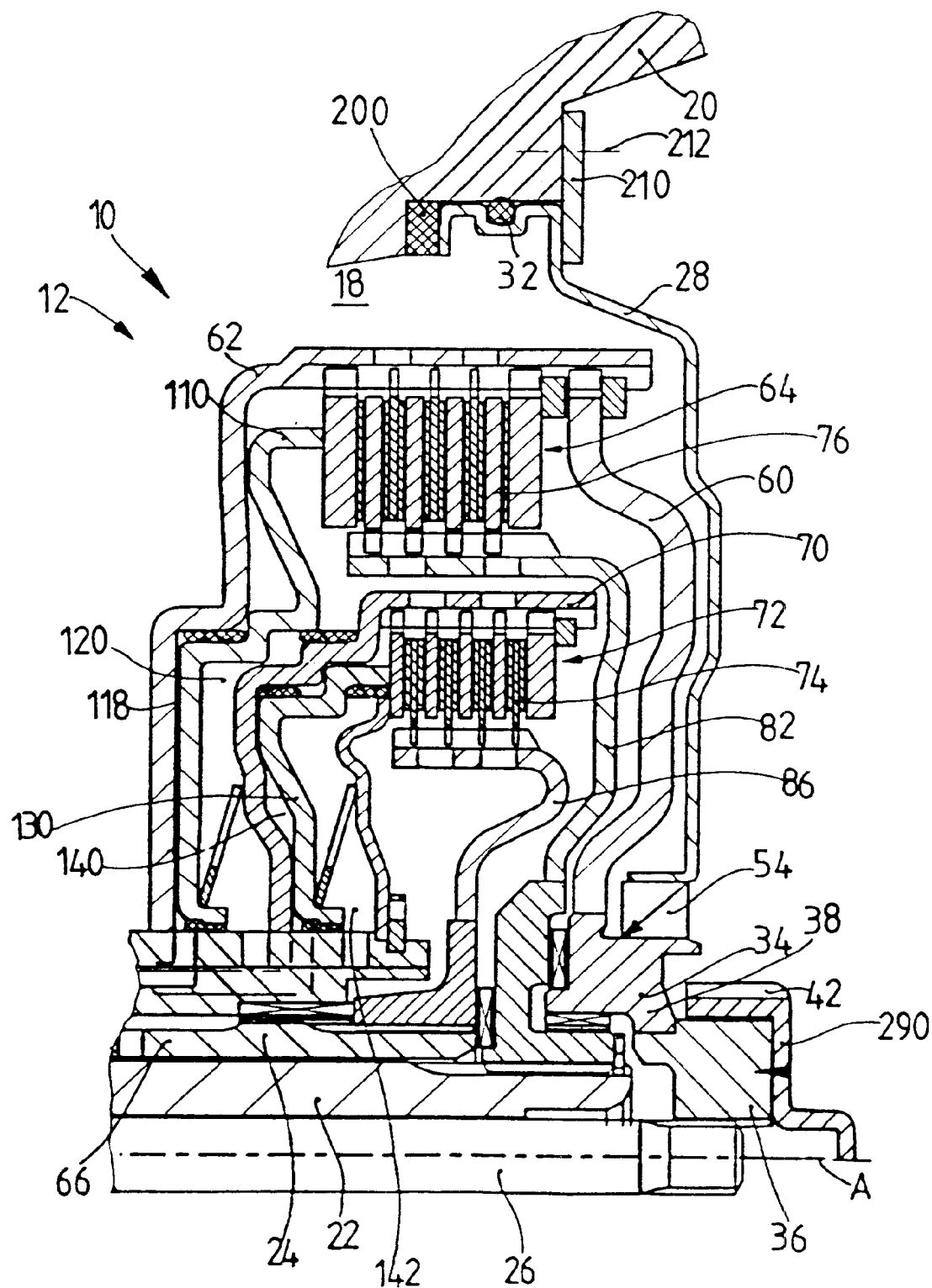
FIG. 8 depicts sealing of the lid with the clutch housing with an annular ring element of rubber or plastic as well as use of an annular securing plate for axial securing of the ring element.

In order to bring any residual leakage under control, for example, when it is desirable to make do with a particularly simple sealing arrangement, e.g., only one O-ring, an oil drain formed by a channel 220 can be provided in the clutch housing 20 corresponding to the embodiment example in FIG. 6. It is sufficient when the channel 220 is provided only in a lower area of the clutch housing; that is, it need not be formed all around. The channel 220 can be connected with a collecting reservoir. In some cases, it is also sufficient when the channel is only emptied via a drain at intervals in the course of regular maintenance.

As regards a wet clutch arrangement or wet clutch arrangements, another location to be sealed is located on the radial inside between the input side (hub 34) of the clutch device and the lid 28. Since the lid 28 is stationary and the hub 34 rotates when the drive unit is running, a correspondingly effective sealing arrangement 54 which withstands the rotation of the hub 34 relative to the lid 28 without excessive wear should be provided; in addition, this sealing arrangement 54 can function as a bearing under certain circumstances. Similar to the embodiment example in FIG. 1, the sealing arrangement 54 is secured axially in the embodiment examples of FIGS. 3, 9 and 14 by means of a bent lid edge portion or "overhang" (FIG. 3, FIG. 14) or pressed material at the lid edge (FIG. 9). The lid 28 can be slit in the area of the overhang. Otherwise, the part of the lid in the radial area of the sealing arrangement 54 should at least be closed in order to prevent leaks as far as possible.

An important aspect is the bearing support of the clutch device in the drivetrain. The clutch device is preferably supported axially and radially at the transmission input shafts 22 and 24 and not at all or, at most, only secondarily (for example, with the intermediary of the lid 28 and/or a connection sleeve receiving the ring part 66) at the transmission housing. In this way, the tolerances that must be met by the transmission housing in the area of the housing cover 18 and by the clutch device (double-clutch 12) are not as strict. Bearings which serve as both axial and radial bearing support are preferably used. Reference is had to the bearings 68 in the embodiment examples of FIGS. 1, 3 and 11. The axial and radial bearings, which may be called compact bearings depending on the construction, can be constructed so as to allow the cooling fluid, in this case, the cooling oil, to flow through them and accordingly enable the advantageous supply of oil between the ring part 66 on the one hand and the transmission input shafts 22, 24 on the other hand.

A further aspect relates to the guiding of the actuating pistons 110 and 130. As has already been described in connection with the embodiment example in FIG. 1, the actuating piston 110 of the first plate clutch arrangement 64 having the radial outer plate stack 76 is guided so as to be displaceable at the first outer plate carrier 62 and at the second outer plate carrier 70. This twofold guiding at both the first and second outer plate carrier is especially useful particularly when the actuating piston, as in the embodiment examples shown here, acts at the plate stack 76 by a portion 230 (FIG. 2) which projects radially outward relatively far from the radial area of the first pressure chamber 118 and which accordingly has a relatively long effective lever arm. The counterforces of the plate stack exerted on the actuating piston 110 via the lever arm 230 can accordingly be safely carried off into the outer plate carrier without deformation of the actuating piston 110, which could lead to self-locking. As regards the second actuating piston 130, deformations of this kind are of less concern when—as in the embodiment examples shown herein—the portion of the actuating piston 130 projecting toward the second plate stack 74 projects less far radially and consequently no significant "force amplification" occurs due to an effective lever arm. An additional guiding of the second actuating piston 130 corresponding to the guiding of the first actuating piston 110 at the second outer plate carrier 70 is achieved likewise with the intermediary of the seal 136 at the wall portion 132 (compare FIG. 1).

An important aspect is the sealing of the pressure chambers and the pressure compensation chambers. With respect to pressure compensation chamber 142, an extremely advantageous construction of the sealing element 136 is realized in the embodiment example in FIG. 2. The sealing element 136 is constructed as a curved sealing element 136' which is placed over the plate part forming the wall 132 at the radial outer edge or is injection-molded on this edge. This construction of the sealing element 136' facilitates assembly in particular and, as a result, the sealing element 136' is secured axially to the edge of the wall portion 132, that is, it does not move along with the actuating piston 130.

Figure 2:
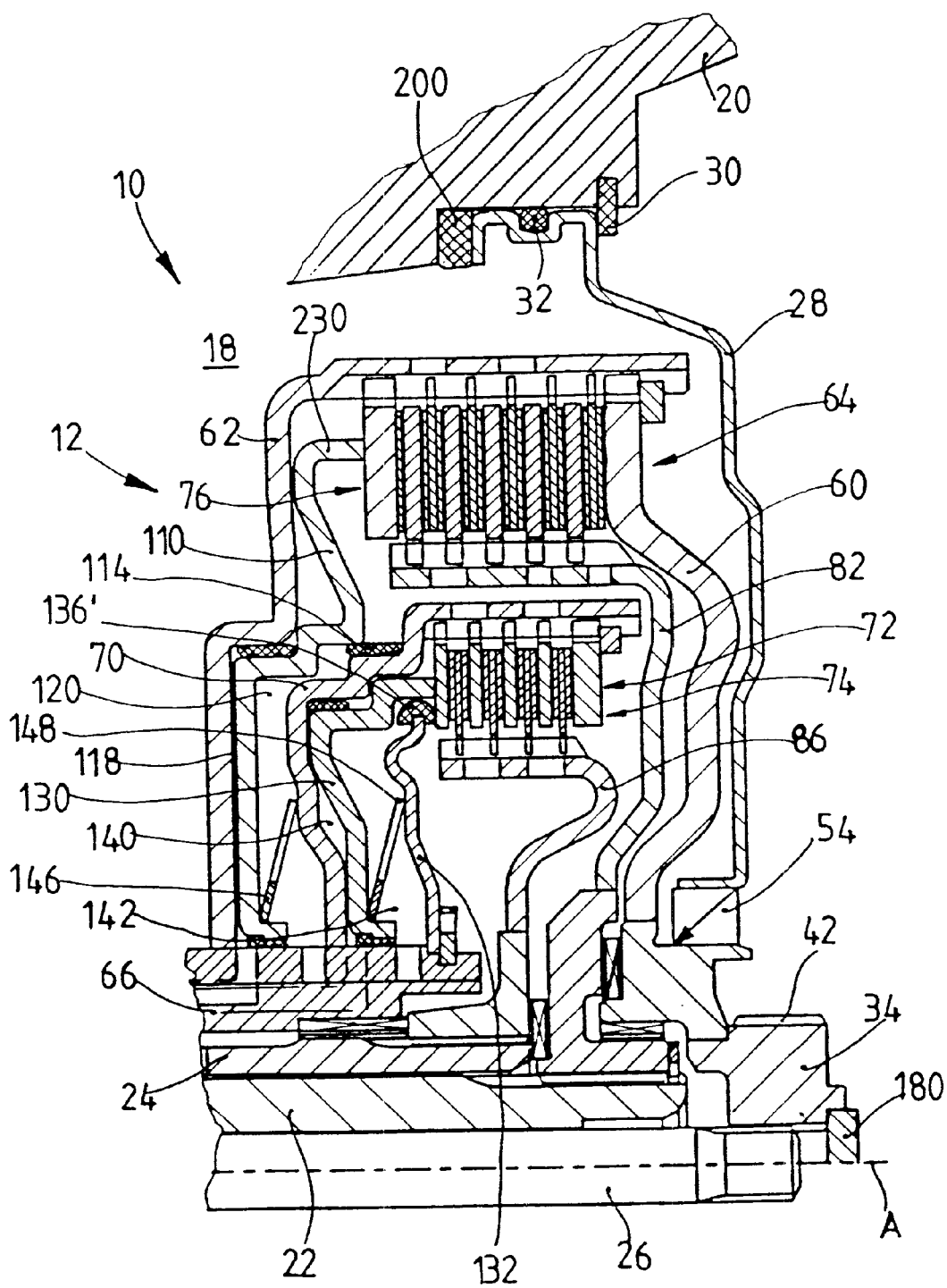
FIG. 2 is a view similar to FIG. 1 depicting input shaft bearing arrangements.

The sealing element 136' in FIG. 2 can have an axial dimensioning such that it acts at an associated portion of the second actuating piston 130 when the second plate clutch arrangement 72 is engaged and acts as a spring element which reinforces the opening of the second plate clutch arrangement 72, that is, which pretensions the actuating piston 130 in the direction of a release position. Also, the seal 114 acting between the second outer plate carrier 70 and the first actuating piston 110 can be constructed in a corresponding manner, so that the releasing movement of the first actuating piston 110 is also reinforced by the seal 114.

Concerning the second actuating piston 130, its releasing movement can also be supported alternatively or additionally by the wall portion 132 which can be constructed so as to be elastically deformable for this purpose. By reinforcing the releasing movements of the actuating piston, the plate clutch arrangements respond quicker as regards disengagement than would be the case if only the diaphragm springs 146 and 148 (FIG. 1) were provided. With reference to FIG. 2, both diaphragm springs are arranged in the respective pressure compensation chamber 120 or 142.

As an alternative to the construction of the sealing elements as ring elements extending essentially in axial direction in cross section, FIGS. 7c and 7d show the alternative constructions of the double-clutch 12 in the area marked 'x' in FIG. 7a. According to the constructional variants shown in FIG. 7c, annular grooves 240 are worked into the outer plate carrier 62 (and/or alternatively or additionally—into the piston 110); these annular grooves 240, together with an associated surface of the other respective part (piston or outer plate carrier), form a labyrinth seal. Sealing elements made of plastic, rubber or the like can then be dispensed with. This is particularly advantageous inasmuch as the two elements engaging with one another in a sealing manner can have the same thermal expansion coefficient. In this way, no substantial changes in the friction between the elements in sealing engagement with one another and no noteworthy deterioration in sealing action, possibly leakage, occurs in the event of changes or fluctuation in temperature.

Another possibility for constructing the seals is shown in FIG. 7d. Instead of the sealing ring 112 in FIG. 7a, which extends primarily in axial direction in cross section, a sealing ring 112' is provided according to FIG. 7d which extends predominantly in radial direction in cross section and which is inserted in a shaped portion 250 of the first actuating piston 110. The sealing element 112' acts at an inner circumferential surface of the first outer plate carrier 62 in the manner of a wiper or stripper. The sealing element 112' is tensioned between the inner circumferential surface of the outer plate carrier 62 and a base of the shaped portion 250 of the actuating piston 110 in such a way that the curvature of the sealing element 112' shown in FIG. 7d results in the disengaged state of the first plate clutch arrangement 64. When the first plate clutch arrangement is engaged, the sealing element 112' is relaxed and stretched (in cross section). Accordingly, maximum advantage is taken of the sealing engagement of the sealing element 112' in the state shown in FIG. 7d, that is, when the actuating piston 110 is in its end position corresponding to a disengaged plate clutch arrangement. On the other hand, in contrast to the construction shown in FIG. 7d, it is preferable that the sealing engagement of the respective sealing element is made use of to the maximum when the clutch is engaged. For this purpose, instead of sealing element 112', a sealing element 112" shown in a detail in FIG. 7d can be inserted into the shaped portion 250, this sealing element 112" being curved in the opposite direction to that of sealing element 112' in the relieved state in which it is not yet inserted. In this way, the sealing element 112" is subjected to increasing stretching and accordingly an increasing sealing engagement by the pressure in the pressure space 118 and by the axial movement of the actuating piston 110 for the purpose of engaging. A stretched tension state of the sealing element 112", shown as another detail in FIG. 7d, is reached in the course of the engaging movement of the first actuating piston 110, possibly not until its axial end engagement position, and can be attributed above all to the influence of pressure in the pressure chamber 118 on the sealing element 112" which additionally presses the sealing element into the shaped portion 250. A particularly effective sealing of the pressure chamber 118 is accordingly achieved, specifically, in the engaged state above all or in the course of the engagement of the associated plate clutch arrangement 64. It is extremely useful to provide maximum sealing action in the state of the actuating piston in which it occupies its axial end engagement position, that is, when the plate stack 76 is compressed to a maximum and maximum pressure prevails in the pressure chamber 118. If possible, leakage should not occur especially in this operating situation.

A further advantage of the possible construction shown in FIG. 7d for area x in FIG. 7a (the same applies for the rest of the seals associated with the actuating piston) is chiefly that axial installation space is economized on because a one-sided groove is sufficient and the groove depth can extend in a radially extending portion of the actuating piston 110 (or, alternatively, of the outer plate carrier). Accordingly, small wall thicknesses are possible. The groove forming the shaped portion can be produced simply, for example, by rolling.

Figure 5:
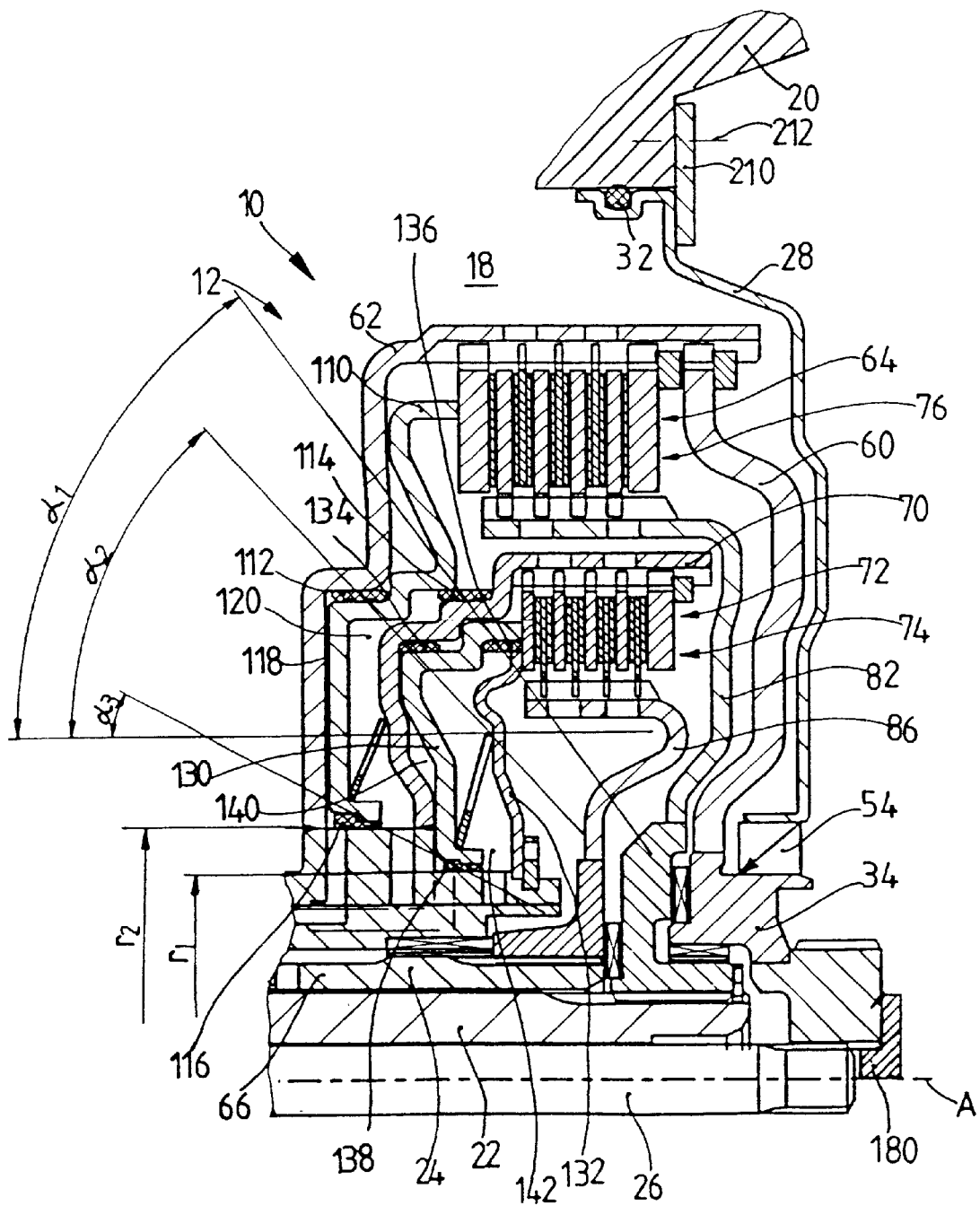
FIG. 5 depicts an advantageous manner of arranging sealing elements in the double-clutch to provide a more compact construction.
Figure 13:
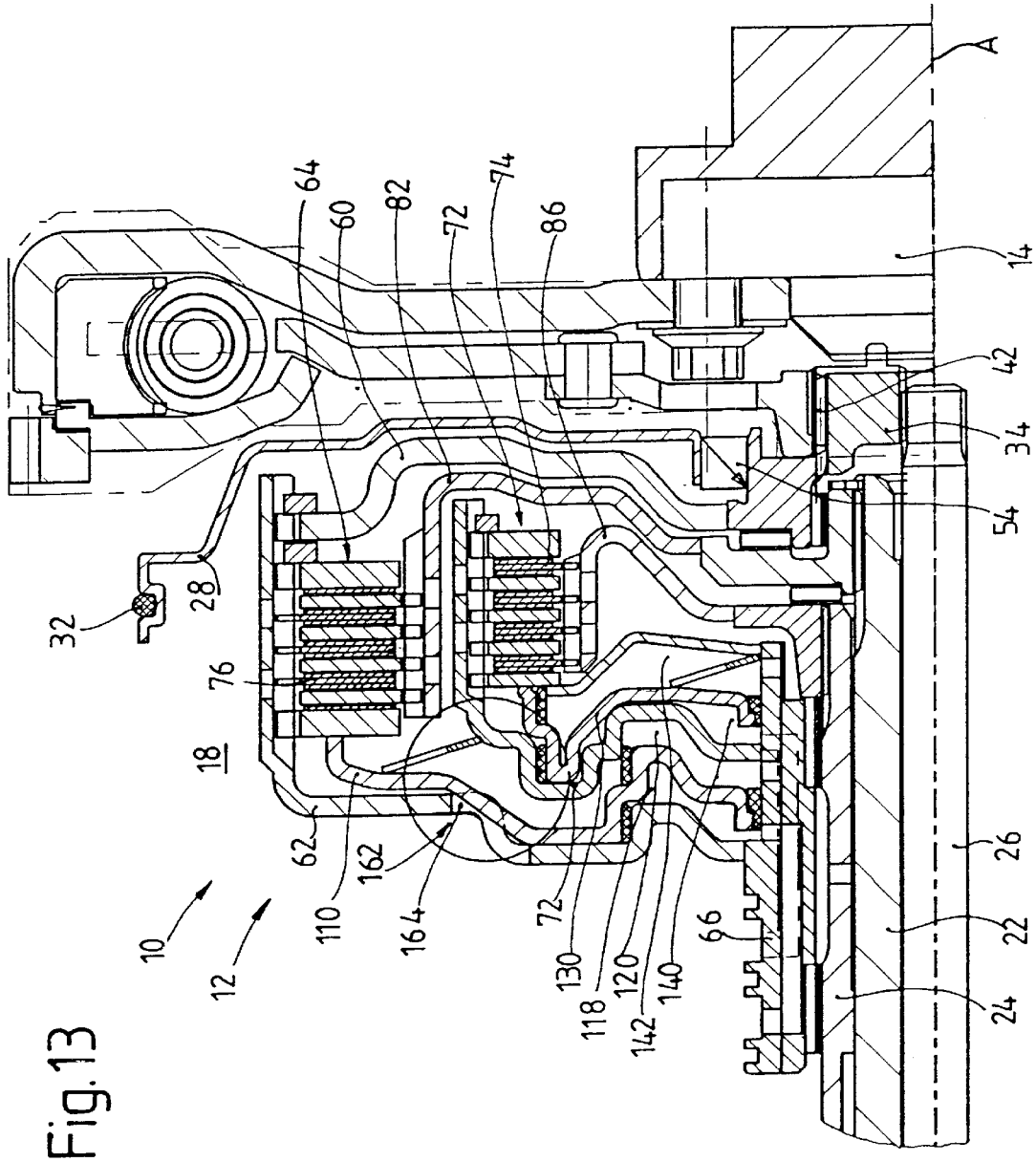
FIG. 13 illustrates how the clutch device is coupled to the drive train via a clutch hub that is preferably via a torsional vibration damper.
Figure 14:
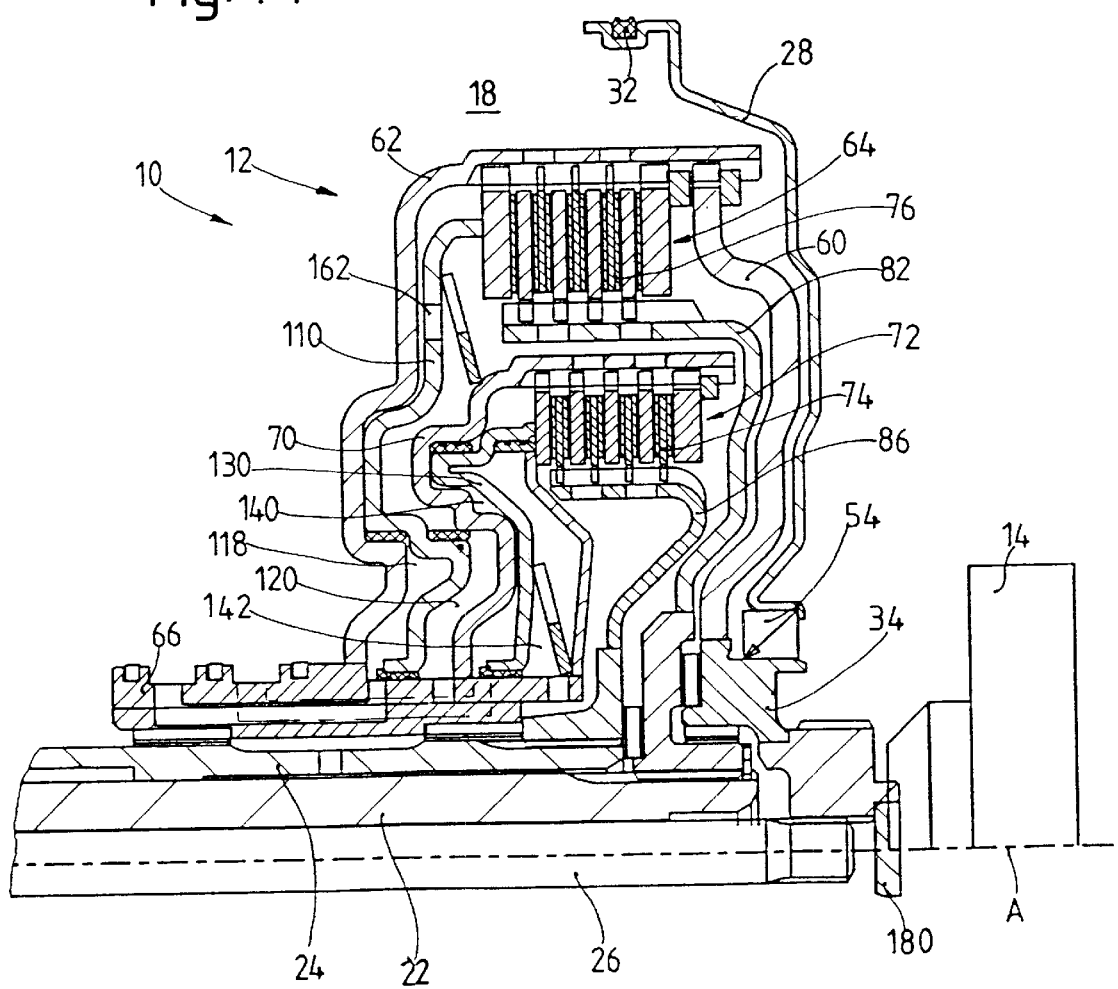
FIG. 14 shows a hub sealing arrangement.

The type of arrangement of the actuating piston and especially of the seals associated with it has an effect on the axial and radial installation space needed. An important parameter in this connection is that of the angles $\alpha_1$, $\alpha_2$ and $\alpha_3$ shown in FIG. 5 which amount to approximately $55°$ ($\alpha_1$), approximately $45°$ ($\alpha_2$) and approximately $25°$ ($\alpha_3$) in the embodiment example in FIG. 5. The angles between a horizontal line parallel to axis A and the straight lines intersecting seals 114 and 136, seals 112 and 134 and seals 116 and 138 are defined as angles $\alpha_1$, $\alpha_2$ and $\alpha_3$. It has been shown that an arrangement of the seals in an angular area corresponding to an angle $\alpha_1$, $\alpha_2$ or $\alpha_3$ of approximately $10°$ to $70°$ is advantageous with respect to the compactness of the double-clutch 12. Angles $\alpha_1$ and $\alpha_2$ are particularly important in this respect. It is apparent from FIG. 5 that it is not required that seals corresponding to one another must run on the same diameter or radius. Rather, it can be extremely advantageous, for instance, with respect to compactness, to arrange these seals on different diameters or radii (radii $r_1$ and $r_2$ associated with seals 116 and 138 are indicated in FIG. 5). This can also be contributed to in particular in that the effective piston surface of the first actuating piston 110 is smaller than the effective piston surface of the second actuating piston 130 so that the actuating pressures occurring in the pressure chambers 118 and 140 are adapted to one another. This is because, as a rule, both clutch arrangements must transmit the same torque, but the second plate clutch arrangement requires a greater contact pressing force for this purpose because the average friction radius of its plate stack 74 is smaller than the plate stack 76 of the first plate clutch arrangement 64. Another possibility for providing the second actuating piston 130 with a greater effective pressure surface subjected to the pressure medium in the pressure chamber than the first actuating piston 110 is shown in FIG. 13. Additionally, reference is had to the remarks pertaining to the embodiment example in FIG. 1.

Figure 11:
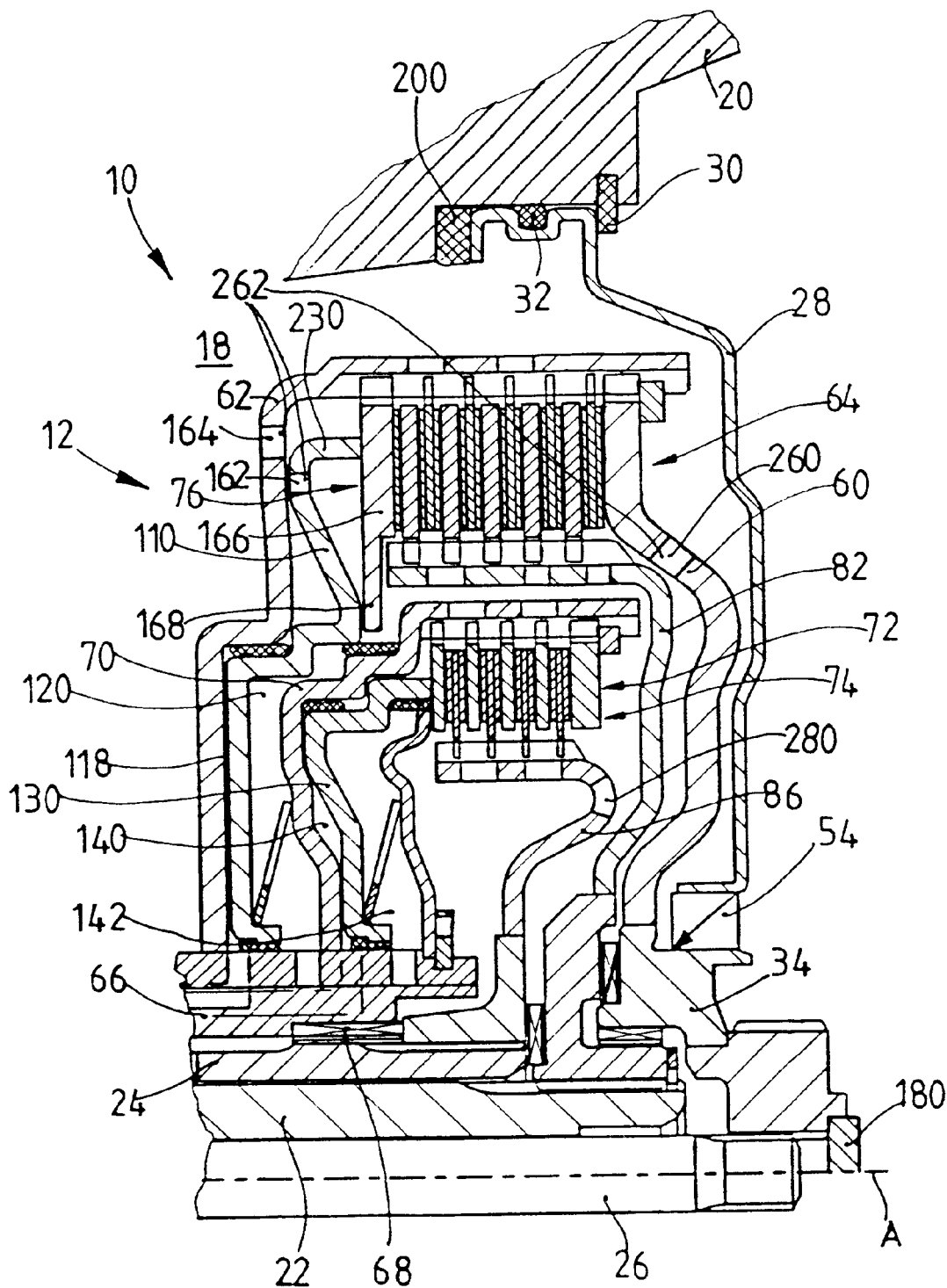
FIGS. 11 and 12 show further aspects of the clutch construction.

Regardless of the construction of the clutch device in particular, it is important in wet clutch arrangements to prevent unwanted effects of the cooling fluid, especially the utilized cooling oil or the like. Accordingly, as was already mentioned with respect to the embodiment example in FIG. 1, unwanted effects of the centrifugal force pressure of the oil can be reduced by openings (such as bore holes) in the plate carriers and/or actuating pistons. Accordingly, deformations of the plate carriers in particular, which can result in checking or impairment of the piston movement, can also be prevented. With respect to providing openings 162 and 164 in the piston 110 and in the outer plate carrier 62 (compare FIG. 11), the construction of the adjacent end plate 166 as a conducting element with a conducting portion 168 is particularly useful in order to provide for a sufficient volume flow through the plate stack 76 in spite of the flow-off possibility for the cooling oil through the openings 162 and 164. A corresponding through-flow opening 260 is also provided in the carrier plate 60 in the embodiment example of FIG. 11. In FIG. 11, the openings 162, 164 and 260 are designated in their entirety as a centrifugal force pressure reduction device 262 of the first plate clutch arrangement 64.

In the embodiment example of FIG. 13, the first outer plate carrier 62 and the first actuating piston 110 are constructed in a special manner with respect to the cooling oil outlet openings 162 and 164 so as to economize on axial space in the area of the outer plate carrier 72 of the second (inner) plate clutch arrangement on the one hand and, if desired, to prevent rotation of the first actuating piston 110 relative to the outer plate carrier 62 on the other hand. For this purpose, the first outer plate carrier 62 and the first actuating piston 110 are partially recessed alternately in the circumferential direction, so that locations of the actuating piston 110 that are not recessed engage in recessed locations of the outer plate carrier 62 and locations of the outer plate carrier 62 that are not recessed engage in recessed locations of the actuating piston 110. It is useful to provide the aforementioned protection against rotation insofar as additional loading of the seals acting between the outer plate carrier 62 and the actuating piston 110 through microrotation due to engine unevenness can be prevented. In order to achieve this protection against rotation, the actuating piston 110 and the outer plate carrier 62 must also engage with one another in the engaged state of the first plate clutch arrangement 64, which would not be necessary otherwise.

Concerning the centrifugal force pressure compensation achieved at the actuating piston itself by the pressure compensation chambers, the pressure chamber associated with an actuating piston and the pressure compensation chamber associated with this actuating piston extend along the same radial area in the embodiment examples in FIGS. 2 to 14, so that fill level limiting means, for example, in the form of a fill level limiting opening 156 of the pressure compensation chamber 142 of the embodiment example in FIG. 1, are not required. In general, it should be noted with respect to the centrifugal force compensation at the piston that the pressure chamber seals and the pressure compensation chamber seals need not necessarily have the same radius. It matters only that the pressure difference between the pressure chambers and the associated centrifugal force pressure compensation chambers caused by centrifugal force does not exceed a maximum value and preferably approaches zero. Apart from the outer diameter of the piston chambers which is determined by the radial outer seals, the pressure difference also depends on the inner diameter of the piston chambers determined by the radial inner seals and can accordingly be influenced by means of this. The filling level limiting means already mentioned can be provided in addition if required.

Figure 3:
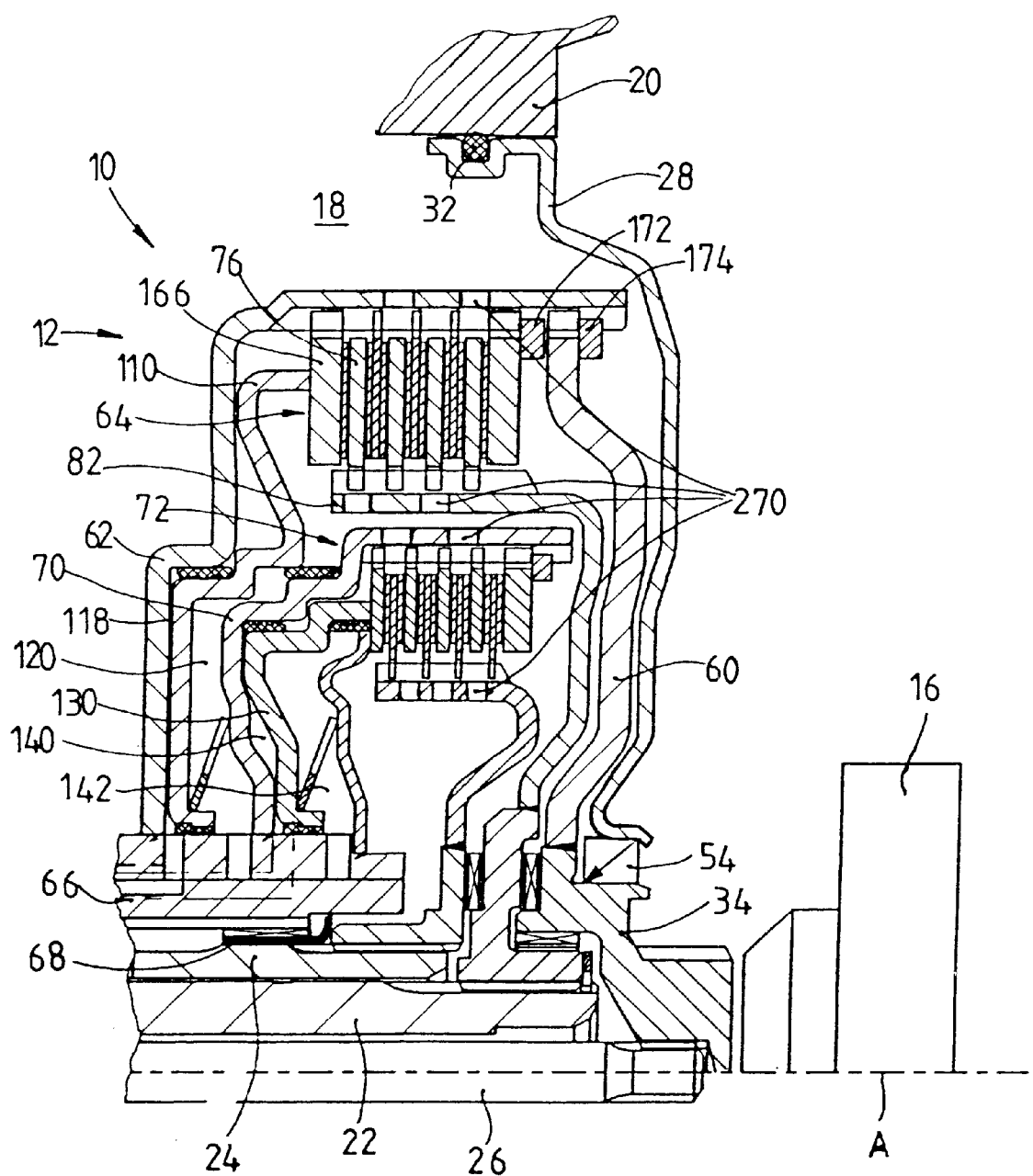
FIG. 3 is a view similar to FIG. 1 showing a form of seal of the lid to the clutch housing.
Figure 4:
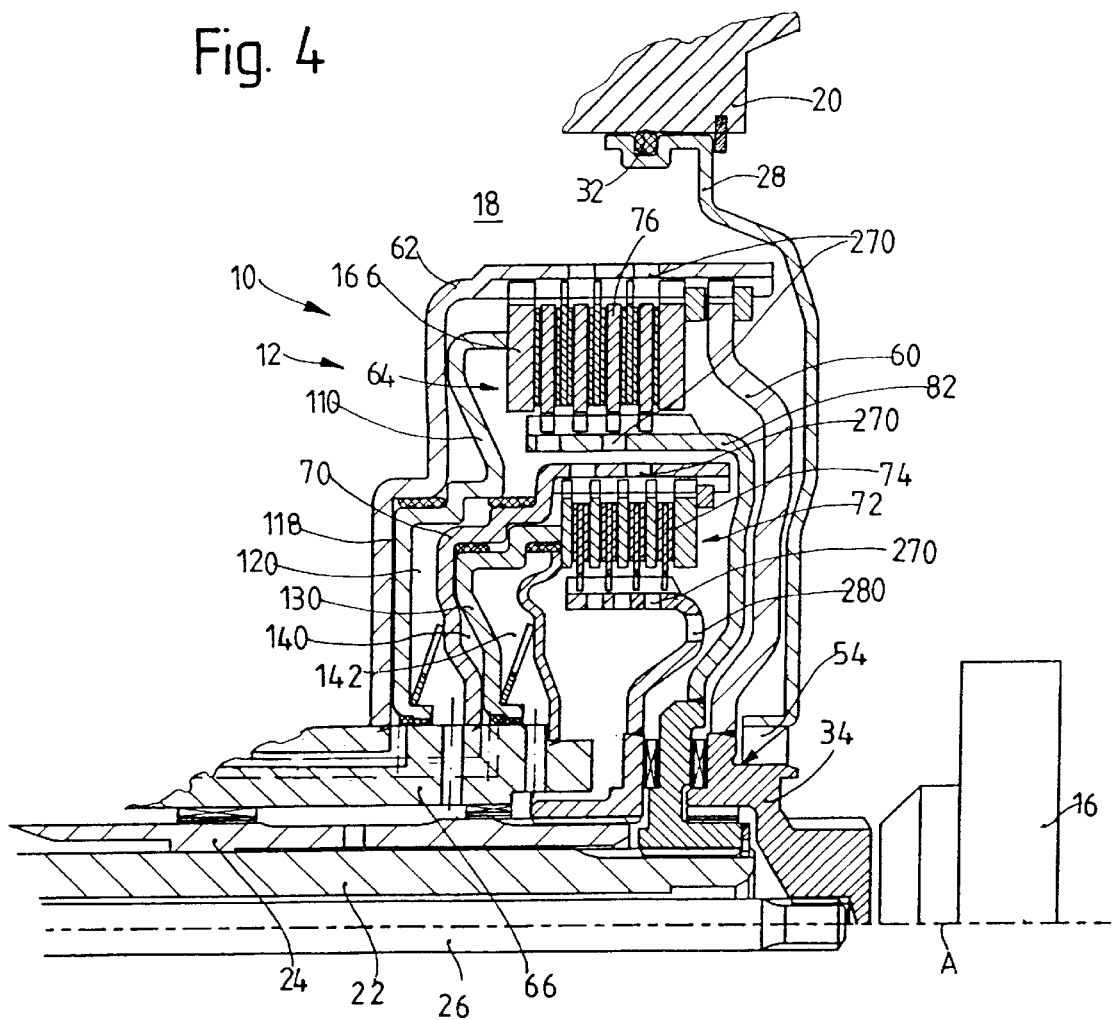
FIG. 4 is a view of a variable of the double clutch construction of FIG. 3.

An important subject pertains to controlling the output losses occurring in the multiple-clutch device, or double-clutch device, as the case may be, in frictional engagement operating situations of a respective clutch arrangement, especially also in the case of slip operation of the clutch arrangement. For this purpose, it is extremely useful to form the clutch arrangements as wet-type plate clutch arrangements as is the case in the embodiment examples of FIGS. 1 to 14. For an effective through-flow through the plate stacks 74 and 76 and, therefore, for an effective dissipation of friction heat, through-openings which are associated with the respective plate stack and designated in their entirety by 270 in FIGS. 3 and 4 are preferably provided in the plate carriers. With respect to plate stacks which have metal plates (usually steel plates) without facings and plates with facings, the through-openings 270 are preferably arranged in such a way that the cooling fluid, in this case, the cooling oil, flows directly past the steel of plates at least in the engaged state of the respective plate clutch arrangement. This applies especially when insulating materials such as paper material are used as friction facings because then virtually the entire heat capacity of the plate stack is provided by the steel plates.

It is not necessary for the through-openings 270 in the respective inner plate carrier 82 or 86 and the through-openings in the outer plate carrier 62 or 70 to be located directly opposite one another or, as the case may be, to be aligned. Rather, the flow path of the cooling oil between the inner plate carrier and the outer plate carrier is advisably lengthened by an axial displacement of the through-openings relative to one another, so that the oil remains in the area of the plate stack longer and has more time for heat absorption of the steel plates and from the shear gap between plates which can be brought into frictional engagement with one another.

In this connection, it should be noted that it is particularly advisable when the oil flowing through the plate stacks has a releasing effect on the plates and accordingly reinforces a fast release of the respective plate clutch arrangement. For this purpose, an effective oil flow between the plate stack and the axially extending ring portion of the outer plate carrier 62 and 70, respectively, and/or the inner plate carrier 82 and 86, respectively, which exerts a dragging effect on the plates is preferably made use of by means of corresponding arrangements of the through openings 270 and by providing the possibility for the oil to flow axially out of the area of the plate stack in the direction of the actuating piston (in connection with impeding or suppressing an axial flow of oil out of the area of the plate stack in the opposite direction toward the carrier plate 60).

The majority of output losses occur during startup at the clutch arrangement which is used as starting clutch. Therefore, it must be ensured that the clutch arrangement serving as starting clutch is cooled in a particularly effective manner. If the first plate clutch arrangement 64 having the radial outer plate stack 76 serves as starting clutch, as is preferred, then it is advisable to guide a large portion of the oil volume flow past the inner clutch arrangement 72. For this purpose, as is shown in FIGS. 4 to 11, the second inner plate carrier 86 can be formed with through-openings 280 to enable oil to flow past the plate stack 74 radially outward to the plate stack 76. The inner plate carrier 82 of the outer plate clutch arrangement 64 then preferably serves as a baffle for the oil flow, so that at least the predominant portion of the oil flowing through the through-openings 280 reaches the through-openings 270 in the inner plate carrier 82 which are associated with plate stack 76. In this connection, the construction of the end plate 166 with the conducting portion 168 is also particularly useful, since this ensures that the oil flowing to the through-openings 270 in the inner plate carrier 280 at least predominantly passes through these through-openings and flows through the plate stack 76.

For better control of the friction heat occurring during starting or during slip operation, the heat capacity of the respective clutch arrangement, especially the first clutch arrangement 64, can be increased by various measures. Accordingly, it is possible to increase the number of plates for this clutch arrangement, in this case, the first radial outer clutch arrangement, relative to the number of plates in the other clutch arrangement. Accordingly, in the embodiment examples in FIGS. 2, 11 and 12, the first (outer) clutch arrangement 64 has more plates than the inner (second) clutch arrangement 72. It was recognized that the advantages with respective to the increased heat capacity of the plate stack 76 justified the greater input of material, implied by the different number of plates, for the production of the plates of the two clutch arrangements. A further possibility is to produce at least some of the friction facings from a heat-conductive material. For example, the sintered facings mentioned in connection with the embodiment example in FIG. 1 can be used. Accordingly, for example, in the embodiment examples in FIGS. 3 to 10 and 13, the axial outer plates (end plates) having the facings, that is, the outer plates on the axial outer side, are outfitted with friction facings of sintered material. Because of the high thermal conductivity of the sintered facings, these end plates can be effectively utilized for storing output losses, especially starting output losses. These end plates are constructed so as to be comparatively thick axially for a particularly high heat capacity. Reference is had to the constructions for the embodiment example in FIG. 1.

Figure 12:
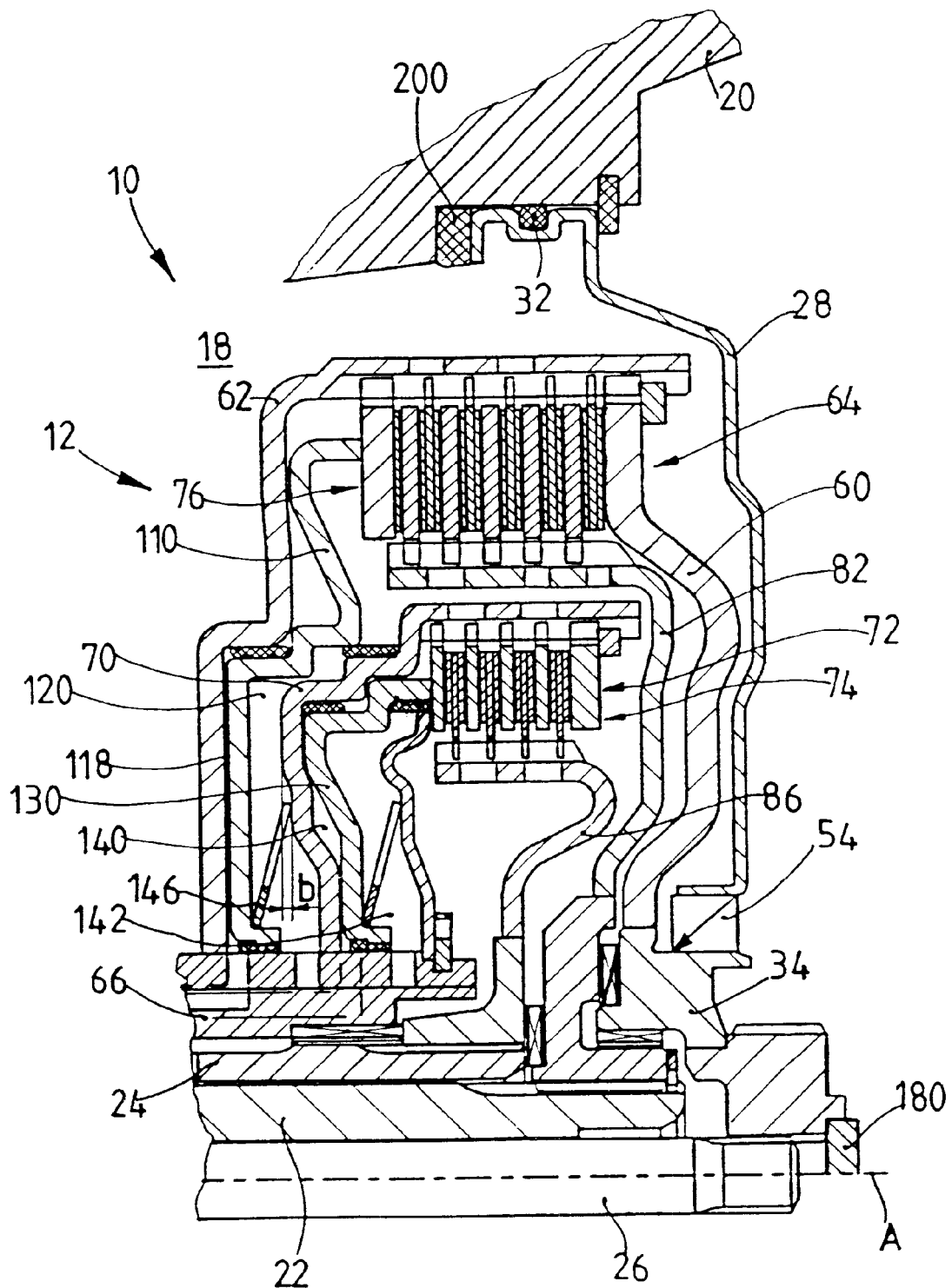

A further possibility for increasing the available heat capacity consists in the use of the carrier plate 60 as a friction surface of the plate stack as is the case in the embodiment examples in FIGS. 2, 11 and 12. The carrier plate 60 has a substantially greater mass than an individual plate and, consequently, a substantially greater heat capacity and can accordingly temporarily store a larger amount of friction heat. Further, the carrier plate has a large surface at which it can interact with cooling oil, so that the buffered heat can be effectively carried off from the carrier plate 60 by the cooling oil.

A difference between the embodiment example in FIG. 11 and the embodiment example in FIG. 12 consists in that the plate which has a facing and which is located on the furthermost right-hand side in the plate stack 76, for example, a paper plate, is shorter in the radial direction (radially inward) in the embodiment example in FIG. 12 than in the embodiment example according to FIG. 11. The reason for this step is that an uneven area pressure of plates having facings can lead to problems, for example, facing separations. In the case of the embodiment example in FIG. 11, there is a risk of an uneven area pressure of the facing-carrying outer plate directly adjacent to the carrier plate 60 because the friction surface of the carrier plate associated with the plate passes into a rounded transitional surface region in which the plate is no longer adequately supported axially. Of course, the radial dimensions of the friction surface of the carrier plate could also be increased to the point that the adjacent plate is uniformly supported at every point. As a result of this, however, more radial installation space would be required. On the other hand, the solution in FIG. 12 is preferred. In this case, the outer plate which is directly adjacent to the carrier plate 60 and which can be brought into frictional engagement with the friction surface of the carrier plate 60 is constructed so as to be shorter radially and accordingly has a smaller inner radius than other outer plates and consequently has a smaller average friction radius than other outer plates. The radial dimensioning of this outer plate is adapted to the radial dimensioning of the friction surface of the carrier plate 60 in such a way that the friction surface of the carrier plate 60 is substantially flat in the radial area of the outer plate. The rest of the plates (outer plates) having facings can have larger radial dimensions than the plate with facing (outer plate) directly adjacent to the carrier plate 60 because the adjacent, axially outermost inner plate (steel plate) provides for a uniform area pressure over the larger friction facing surface as well. Other plates with facings in the plate stack can also differ with respect to their average friction radius for making the area pressure more uniform, that is, they can have somewhat different inner radii in the case of outer plates. In this way, temperature profiles which specifically protect against a deformation of the steel plates due to heat can be adjusted in the steel plates not having facings. Further, it is possible by means of corresponding temperature profiles to deliberately adjust deformations of steel plates caused by heat which compensate for deformations of other steel plates caused by heat, so that the area pressure is rendered uniform overall.

As concerns providing friction facings of different material in a plate stack, it has already been noted in connection with the embodiment example in FIG. 1 that the curve of the coefficient of friction can be adjusted in this way between progressive, neutral and degressive. A progressive or at least neutral curve of the coefficient of friction is preferred in order to counter a buildup of torsional vibrations in the drivetrain and, to this extent, torsional vibrations do not pose a problem because, for example, special steps have been taken to damp or suppress torsional vibrations. Accordingly, it is certainly possible to produce all of the friction facings of a plate stack from sintered material so that all of the plates having friction facings, with their heat capacity, are available as heat buffers.

It has already been mentioned that the two diaphragm springs 146 and 148 (compare FIG. 2) are arranged in the respective pressure compensation chambers (120 and 142) in the embodiment examples in FIGS. 2 to 12 so as to make good use of the available installation space. According to the embodiment example in FIG. 12, the outer plate carrier 70 has a step with height b at the radial outer side of the diaphragm spring 146 which serves as an end stop for the actuating piston 110. The step height b is adapted to the thickness of the diaphragm spring 146, so that the diaphragm spring is prevented from bending in the direction opposite to that shown in FIG. 12 due to the actuating piston 110 traveling to the right. Therefore, a flat contact face for the diaphragm spring 46 at the inner plate carrier 70 is not required, so that the inner plate carrier 70 can be designed with respect to its cross-sectional shape in a useful manner for purposes of minimizing the required installation space.

In all of the embodiment example of FIGS. 1 to 14, the clutch device is coupled to the drive unit of the drivetrain via the clutch hub 34, that is, preferably via a torsional vibration damper as is shown in the example in FIG. 13. Further, a pump drive shaft 26 is provided as the radially innermost shaft in all of the embodiment examples in FIGS. 1 to 14, this radially innermost shaft being coupled to the clutch hub 34 via teeth. In this connection, reference is had to the comments regarding the embodiment example in FIG. 1.

For technical reasons pertaining to manufacture, the hub is preferably constructed in two parts (ring portions 36 and 38 of the hub in FIG. 1). In the embodiment examples in FIGS. 2, 5, 8, 9, 10, 11, 12, 13 and 14, the hub 34 is also constructed in two parts in a corresponding manner, while the hub 34 is constructed in one piece in the embodiment examples in FIGS. 3, 4, 6 and 7.

Further for technical reasons pertaining to manufacture, it is preferred that the hub is constructed as a ring part opening toward the drive unit, so that the internal toothing of the hub associated with the pump drive shaft 26 can be cleared easily. The opening of the hub can be advantageously closed by means of a sealing element, for example, a sealing journal 180 corresponding to FIG. 5. The sealing journal 180 can be centered by the internal toothing of the hub 34 and welded to the hub. Another possibility is realized in the embodiment example in FIG. 8. In this case, a closure plate part 290 welded to the hub 34, or, more precisely, to the ring portion 36 of the hub, is provided in place of a sealing journal or the like and has the external toothing 42 associated with the torsional vibration damper (not shown) at a flange portion. The closure plate part 290 can have a journal-like portion for self-centering of the plate part 290 at the hub 36. Alternatively or additionally, the plate part 290 can have a journal-like portion which serves for mutual centering of the engine shaft and transmission input shafts. The clutch hub 34 itself can also perform this function. In the embodiment example in FIG. 5, the hub 34 is constructed without an opening in the area of the internal toothing.

It should be added that the possibility of reinforcing a disengagement of the respective plate clutch arrangement mentioned in connection with the sealing element 136' and in connection with the flow of cooling oil through the plates is advantageous in many respects, for example, when the plate clutch arrangement in question is to be operated with regulated slip. Other components of the clutch device which are present in any case can also act in this way, for example, the wall portion 132 which defines the second pressure compensation chamber 142 and which can serve as a spring element pretensioning the associated actuating piston in the releasing direction, as was already indicated in the preceding.

Further details of the double-clutches 12 according to the different embodiment examples and especially differences between the various double-clutches will be readily discerned from the Figures by the person skilled in the art.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto

We claim:

1. Multiple-clutch device, for installation in a drivetrain of a motor vehicle between a drive unit and a transmission, comprising a first clutch arrangement associated with a first transmission input shaft of the transmission, and a second clutch arrangement associated with a second transmission input shaft of the transmission for transmitting torque between the drive unit and the transmission, at least one of the clutch arrangements being a plate clutch arrangement including a stack of plates carried on a clutch plate carrier, said at least one plate clutch arrangement having an actuating piston, said actuating piston defining a pressure chamber for pressure medium actuating engagement of said at least one plate clutch arrangement, in which at least one of the actuating piston and plate carrier of said at least one plate clutch arrangement, has one of a pressure compensation opening and a cooling fluid outlet opening for supply to said at least one plate clutch arrangement of a cooling fluid from a cooling fluid supply, a conducting element being provided axially proximal to one of the pressure compensation opening, and cooling fluid outlet opening said conducting element reinforcing a flow of cooling fluid through the plates, the conducting element comprising an axial outer plate of said stack of plates, said conducting element having a fluid-conducting portion therein.

2. Clutch device according to claim 1, in which the plate carrier and the actuating piston are alternately cut out in a circumferential direction of each so that one can engage inside the other such that, in at least one stroke position of the actuating piston, at least one uncut area of said actuating piston engages in at least one cutout of the plate carrier, and at least one uncut area of the plate carrier engages in at least one cutout of the actuating piston serving as one of a pressure compensation opening and a cooling fluid outlet opening.

3. Clutch device according to claim 2, in which both of the first clutch and second clutch arrangements are plate clutch arrangements including respective stacks of plates carried on respective clutch plate carriers, the clutch plate carrier of the first clutch arrangement, and the actuating piston associated with said first clutch arrangement being alternately cut out in circumferential direction of each so as to allow said plate carrier and said actuating piston to engage one inside the other, the clutch plate carrier of the second clutch arrangement and an actuating piston associated with said second clutch arrangement being alternately cut out in circumferential direction of each so as to allow the plate carrier and actuating piston of said second clutch arrangement to engage one inside the other.

4. Clutch device according to claim 3, in which the actuating piston of the first clutch arrangement and the plate carrier of the second clutch arrangement are alternately cut out in circumferential direction of each so that one can engage inside the other such that, in at least one stroke position of said first clutch arrangement actuating piston, at least one uncut area of said actuating piston engages in at least one cutout of the said plate carrier serving as one of a pressure compensation opening and a cooling fluid outlet opening, at least one uncut area of said plate carrier engaging in at least one cutout of actuating piston serving as one of a pressure compensation opening and a cooling fluid outlet opening.

5. Clutch device according claim 4, in which for every stroke position of the respective actuating pistons of said first and second clutch arrangements, a piston engagement with its respective plate carrier exists thereby prevent the actuating piston from rotating relative to the respective plate carrier.

6. Clutch device according to claim 5, in which during a piston/plate carrier engagement, essentially no relative rotational play can occur between a respective piston and plate carrier.

7. Clutch device according to claim 1, in which said actuating piston is rotatable relative to the plate carrier for serving as a damping mass.

8. Multiple-clutch device, for installation in a drivetrain of a motor vehicle between a drive unit and a transmission, comprising a first clutch arrangement associated with a first transmission input shaft of the transmission, and a second clutch arrangement associated with a second transmission input shaft of the transmission for transmitting torque between the drive unit and the transmission, in which at least one of the clutch arrangements being a plate clutch arrangement including a stack of plates, there being at least one wall which shields an interior space of the clutch device, said wall being arranged in a torque transmission path between an input side of the clutch device and an output side of one of the clutch arrangements, said one wall having one of a radial outer area and a central area thereof, at least one of a pressure compensation opening and a cooling fluid outlet opening for supply to said at least one clutch plate arrangement of a cooling fluid from a cooling fluid supply, the at least one wall comprising a wall portion which has at least one of a pressure compensation opening and a cooling fluid outlet opening, and which further is used for transmission of a torque between a plate carrier and an input side of the clutch device, a conducting element for reinforcing a flow of the cooling fluid through the plates being provided axially proximal to the one of the pressure compensation opening and the cooling fluid outlet opening of the wall portion, said conducting element comprising one of an axial outer plate of said at least one plate clutch arrangement having a fluid conducting portion and a wall portion located farther outward radially relative to at least one of the pressure compensation opening and/or cooling fluid outlet opening.

9. Multiple-clutch device, for installation in a drivetrain of a motor vehicle between a drive unit and a transmission, comprising a first clutch arrangement associated with a first transmission input shaft of the transmission and a second clutch arrangement associated with a second transmission input shaft of the transmission for transmitting torque between the drive unit and the transmission, in which both of the first clutch arrangement and the second clutch arrangements are plate clutch arrangements including respective stacks of plates carried on respective plate carriers, wherein a path for a cooling fluid flow to the plates of one of the clutch arrangements from a cooling fluid supply includes at least one fluid passage opening in a wall portion of a plate carrier of an other of the clutch arrangements, said wall portion connecting a hub of the plate carrier with a plate retaining portion, a fluid-conducting arrangement being provided for reinforcing a cooling fluid flow through the plates of at least one of the clutch arrangements, the fluid-conducting arrangement comprises a plate of each respective plate clutch arrangement having a fluid-conducting portion.

10. Clutch device according to claim 9, in which a radial outer clutch arrangement of the first and second clutch arrangements surrounds a radial inner clutch arrangement annularly, the plate carrier having the at least one fluid passage opening being located in the radial inner clutch arrangement.

11. Multiple-clutch device, for installation in a drivetrain of a motor vehicle between a drive unit and a transmission, comprising a first clutch arrangement associated with a first transmission input shaft of the transmission, and a second clutch arrangement associated with a second transmission input shaft of the transmission for transmitting torque between the drive unit and the transmission, in which at least one of the clutch arrangements is constructed as a plate clutch arrangement, a plate stack of said one plate clutch arrangement including steel plates, certain of said plates having no facing and other plates having sintered friction facings, an inner plate carrier, and an outer plate carrier of the plate clutch arrangement being constructed such as to allow a supply of at least one flow of a cooling fluid from a cooling fluid supply to enter between plates of the plate stack from a clutch radial inner side during at least one operating state of the clutch arrangement, with the cooling fluid flowing directly against at least one of said steel plates having no facing and said other steel plates having a sintered facing, said cooling fluid flowing directly along the plates having sintered facing in radial outward direction, at least one passage opening in an inner plate carrier of said one clutch arrangement overlaps an axial area occupied by plates of the said one clutch arrangement when said one clutch arrangement is in at least one of an engaged and a disengaged state is allocated to direct cooling fluid flow to the respective ones of said steel plates and plates having the sintered facing, at least one passage opening in an outer plate carrier of said one clutch arrangement is allocated to said respective ones of steel plates and plates having sintered facing against which the cooling fluid flows, the said one outer plate carrier passage opening being one of aligned with and axially offset relative to said one inner plate carrier passage when the clutch arrangement is in at least one of an engaged and a disengaged state, passage openings in the inner plate carrier which are associated with different ones of plates are offset relative to one another in a circumferential direction and passage openings in the outer plate carrier which are associated with different ones of plates are offset relative to one another in a circumferential direction.

12. Multiple-clutch device, for installation in a drivetrain of a motor vehicle between a drive unit and a transmission, comprising a first clutch arrangement associated with a first transmission input shaft of the transmission, and a second clutch arrangement associated with a second transmission input shaft of the transmission for transmitting torque between the drive unit and the transmission, in which at least one of the clutch arrangements is constructed as a plate clutch arrangement including a stack of plates, said one clutch arrangement having an inner plate carrier and an outer plate carrier, said at least one clutch arrangement being constructed such as to allow a supply of at least one flow of a cooling fluid from a cooling fluid supply to enter between the plates of the plate stack from the radial inner side and flow out from the plate stack such that forces are exerted on the plates through the intermediary of the cooling fluid which tend to effect disengagement of the plate clutch arrangement, the cooling fluid flow path including a part for flow of cooling fluid in a first axial direction to an actuating piston of said one plate clutch arrangement and such to pass a plate stack end plate on the actuating piston side of the said one clutch arrangement and, cooling fluid flow path parts for flow are provided radially between the outer plates of the plate stack and the inner plate carrier, and additionally cooling fluid flow in a radial direction between adjacent plates of the plate stack and, cooling fluid flow radially between the inner plates of the plate stack and the outer plate carrier with additional cooling fluid flow in a radial direction through passage openings in the outer plate carrier.

13. Clutch device according to claim 12, in which the cooling fluid flow path is such that cooling fluid can flow in a second axial direction opposed to the first axial direction to a counter-bearing which is associated with the actuating piston and which supports the plate stack the counter bearing is deterred at being arranged such that cooling fluid flow past another stack end plate proximal said counter bearing the counter-bearing side relative to a preferential flow in the direction of the actuating piston so as to pass the end plate on the actuating piston side.

14. Multiple-clutch device, for installation in a drivetrain of a motor vehicle between a drive unit and a transmission, comprising a first clutch arrangement associated with a first transmission input shaft of the transmission, and a second clutch arrangement associated with a second transmission input shaft of the transmission for transmitting torque between the drive unit and the transmission, in which at least one of the clutch arrangements is constructed as a plate clutch arrangement having a plate stack in which plates which are associated with the drive unit and which are torque-transmittingly connectable with the clutch device via an input side of the clutch device brought into a frictional engagement with plates associated with one of the transmission input shafts and which are torque-transmittingly connectable with the clutch arrangement via an output side of the clutch arrangement, a path for a cooling fluid flow to the plate stack from a cooling fluid supply is provided in at least some of the plates associated with the drive unit having flow passages in the fluid flow path for directing when the plates are in frictional engagement cooling fluid through the plate stack from a radial inner side to the radial outer side of said plate stack, the plates associated with the drive unit being outer plates.

* * * * *